US008616016B2

(12) United States Patent
Asano et al.

(10) Patent No.: US 8,616,016 B2
(45) Date of Patent: Dec. 31, 2013

(54) AIR CONDITIONER, AIR CONDITIONER MANUFACTURING METHOD, AND COMPRESSOR

(75) Inventors: Yoshinari Asano, Shiga (JP); Tomomi Sakamoto, Shiga (JP); Nobuyuki Kifuji, Shiga (JP); Hirofumi Higashi, Osaka (JP); Shintarou Araki, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 321 days.

(21) Appl. No.: 12/996,951

(22) PCT Filed: Jun. 8, 2009

(86) PCT No.: PCT/JP2009/060478
§ 371 (c)(1),
(2), (4) Date: Dec. 8, 2010

(87) PCT Pub. No.: WO2009/151033
PCT Pub. Date: Dec. 17, 2009

(65) Prior Publication Data
US 2011/0083467 A1 Apr. 14, 2011

(30) Foreign Application Priority Data

Jun. 9, 2008 (JP) ................................. 2008-150890

(51) Int. Cl.
F25B 27/00 (2006.01)
(52) U.S. Cl.
USPC .......................................... 62/238.7; 62/498
(58) Field of Classification Search
USPC ................... 62/498, 162, 238.7, 160, 324.1; 310/156.01, 156.37, 64, 215; 318/521
See application file for complete search history.

(56) References Cited

U.S. PATENT DOCUMENTS

| 4,144,467 | A | * | 3/1979 | Nakajima et al. ...... 310/216.026 |
| 4,831,828 | A | * | 5/1989 | Klusmier et al. .................. 62/6 |
| 6,047,460 | A | * | 4/2000 | Nagate et al. .................... 29/598 |
| 6,047,461 | A | * | 4/2000 | Miura et al. .................... 29/598 |
| 6,144,020 | A | * | 11/2000 | Usui et al. ...................... 219/631 |
| 6,194,852 | B1 | * | 2/2001 | Lovatt et al. ............. 318/400.14 |
| 6,533,558 | B1 | * | 3/2003 | Matsumoto et al. ....... 417/410.3 |
| 6,737,783 | B2 | * | 5/2004 | Yanashima et al. ........... 310/211 |
| 6,849,981 | B2 | * | 2/2005 | Kojima et al. ........... 310/156.43 |
| 7,377,755 | B2 | * | 5/2008 | Cho .............................. 417/310 |
| 7,710,066 | B2 | * | 5/2010 | Hashimoto et al. ........... 318/807 |
| 2010/0225195 | A1 | | 9/2010 | Asano et al. |

FOREIGN PATENT DOCUMENTS

| JP | 63-161363 A | 7/1988 |
| JP | 5-268740 A | 10/1993 |
| JP | 6-101909 A | 4/1994 |
| JP | 11-275789 A | 10/1999 |

(Continued)

Primary Examiner — Mohammad M Ali
(74) Attorney, Agent, or Firm — Birch, Stewart, Kolasch & Birch, LLP.

(57) ABSTRACT

At a time of a heating high-load operation, a harmonic current is flown in an armature winding to induction-heat rare-earth magnets, thus reducing a residual magnetic flux density. Thereby, the number of rotations of a radial gap type motor is improved. The rare-earth magnets are provided near a cooling medium passage extending substantially in parallel with a flow line of a cooling medium, so that the cooling medium recovers heat of the heated rare-earth magnets. At a time of a cooling high-load operation, a greater number of rotations are obtained with respect to the same torque command value, by a field weakening control by means of a current-phase advance.

27 Claims, 29 Drawing Sheets

(56) References Cited

FOREIGN PATENT DOCUMENTS

| | | |
|---|---|---|
| JP | 3021947 B2 | 3/2000 |
| JP | 2000-139047 A | 5/2000 |
| JP | 2000-350490 A | 12/2000 |
| JP | 2001-178177 A | 6/2001 |
| JP | 2004-194406 A | 7/2004 |
| JP | 2004-254421 A | 9/2004 |
| JP | 2004-328859 A | 11/2004 |
| JP | 2006-121877 A | 5/2006 |
| JP | 2006-141106 A | 6/2006 |
| JP | 2006-158049 A | 6/2006 |
| JP | 2006-313023 A | 11/2006 |
| JP | 2007-174872 A | 7/2007 |
| JP | 2007-183395 A | 7/2007 |
| JP | 2007-252018 A | 9/2007 |
| JP | 2008-131742 A | 6/2008 |
| WO | WO 03/079516 A1 | 9/2003 |
| WO | WO 2007/114079 A1 | 10/2007 |

* cited by examiner

F I G . 4
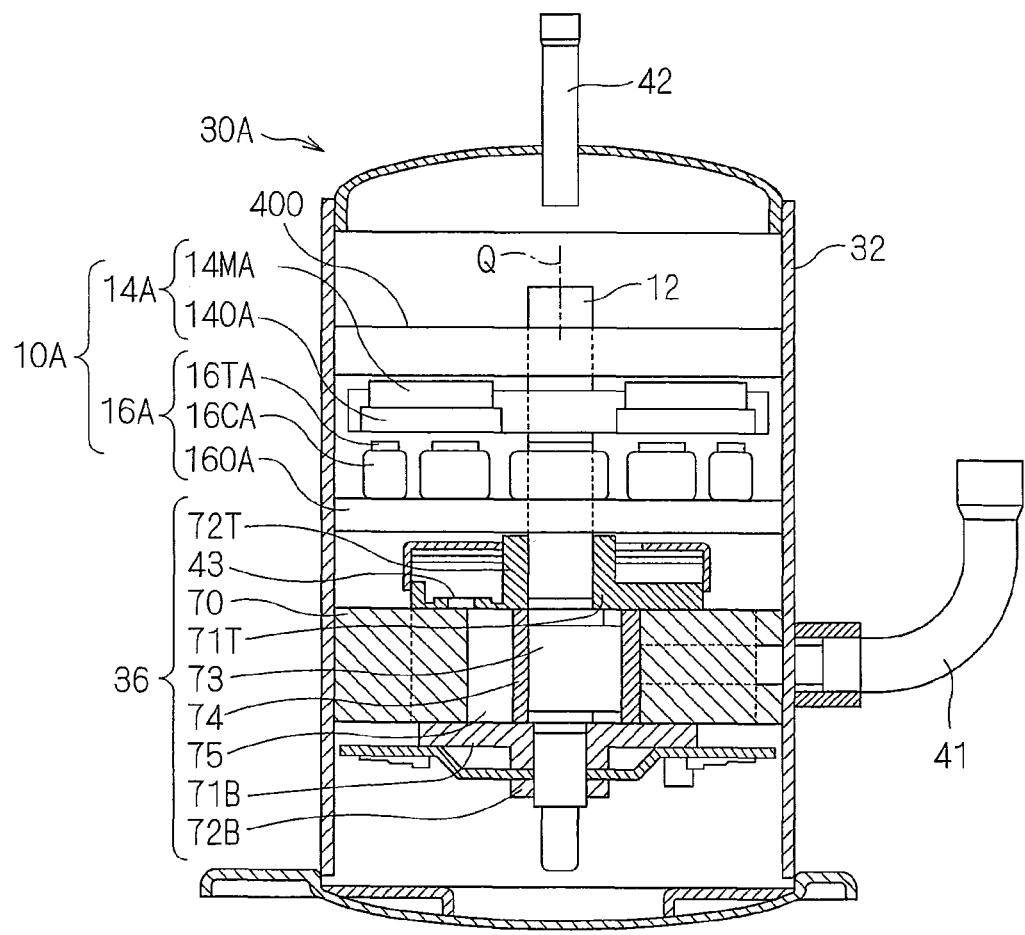

F I G . 5
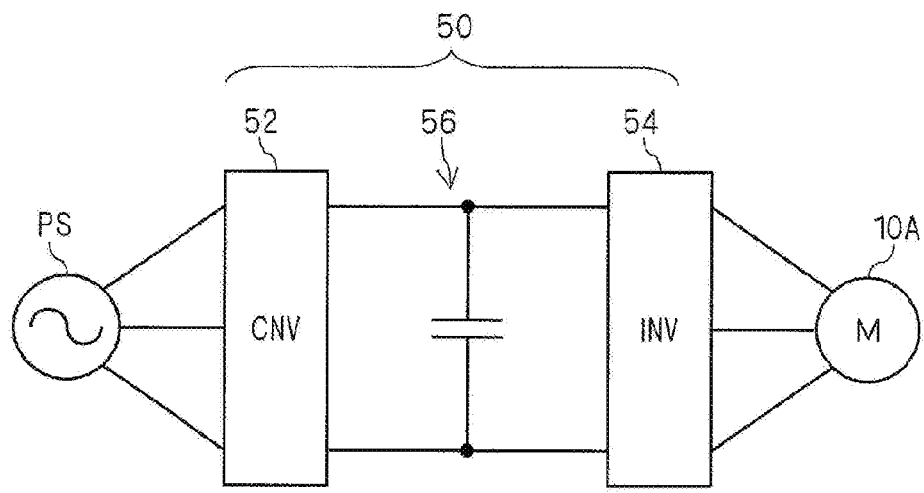
F I G . 6
(a)
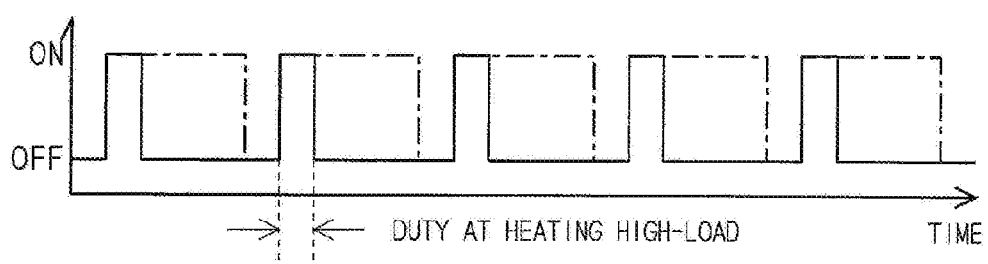
(b)
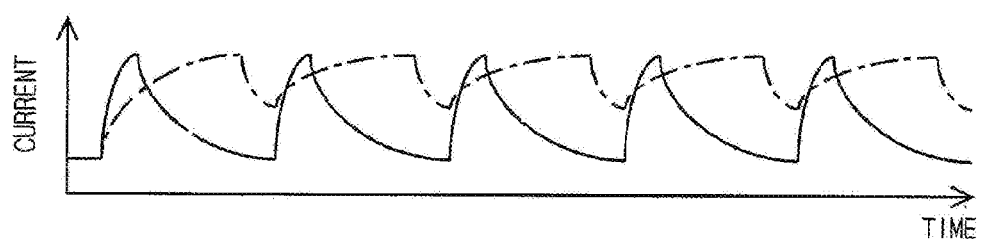

F I G. 1 5
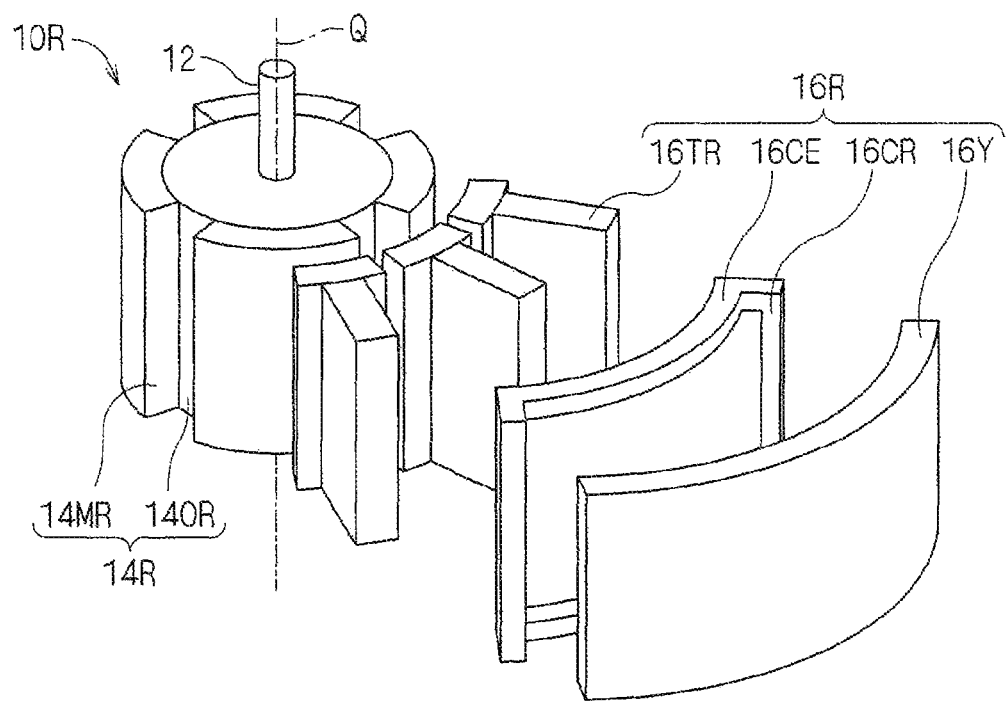

F I G . 2 3
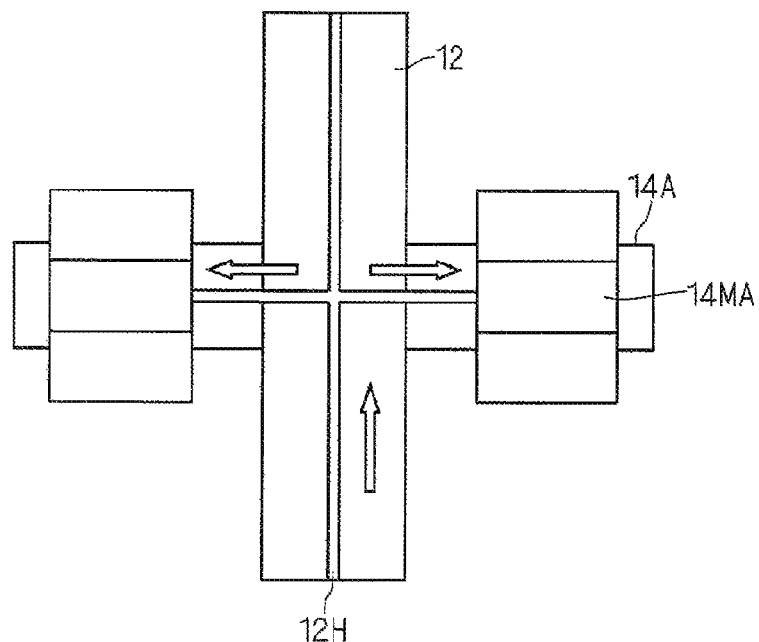
F I G . 2 4
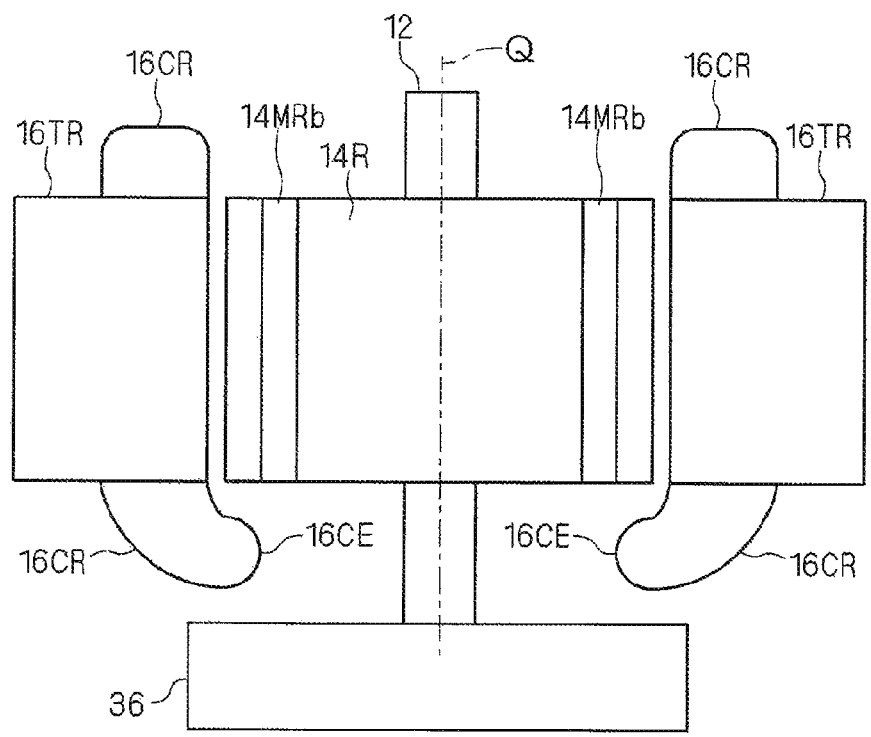

F I G . 3 2
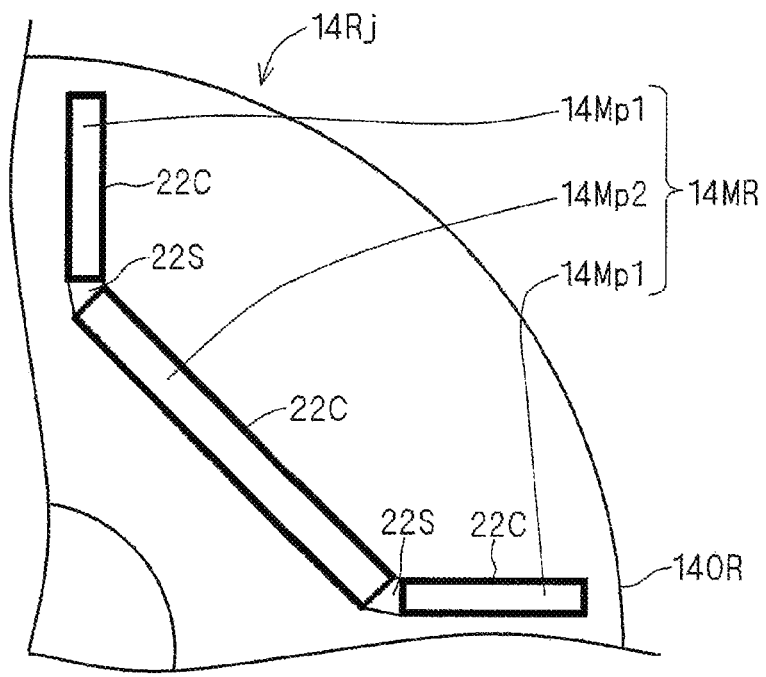
F I G . 3 3
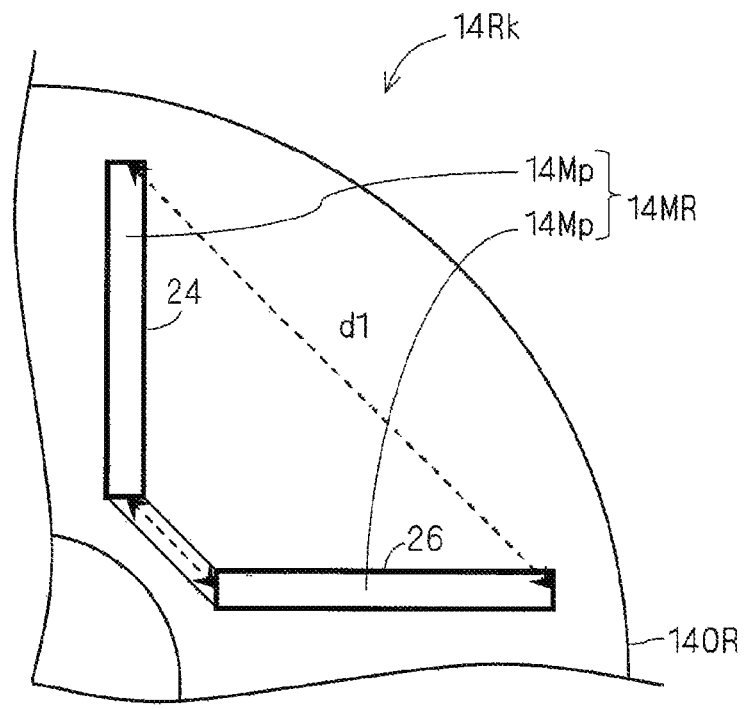

F I G. 3 7
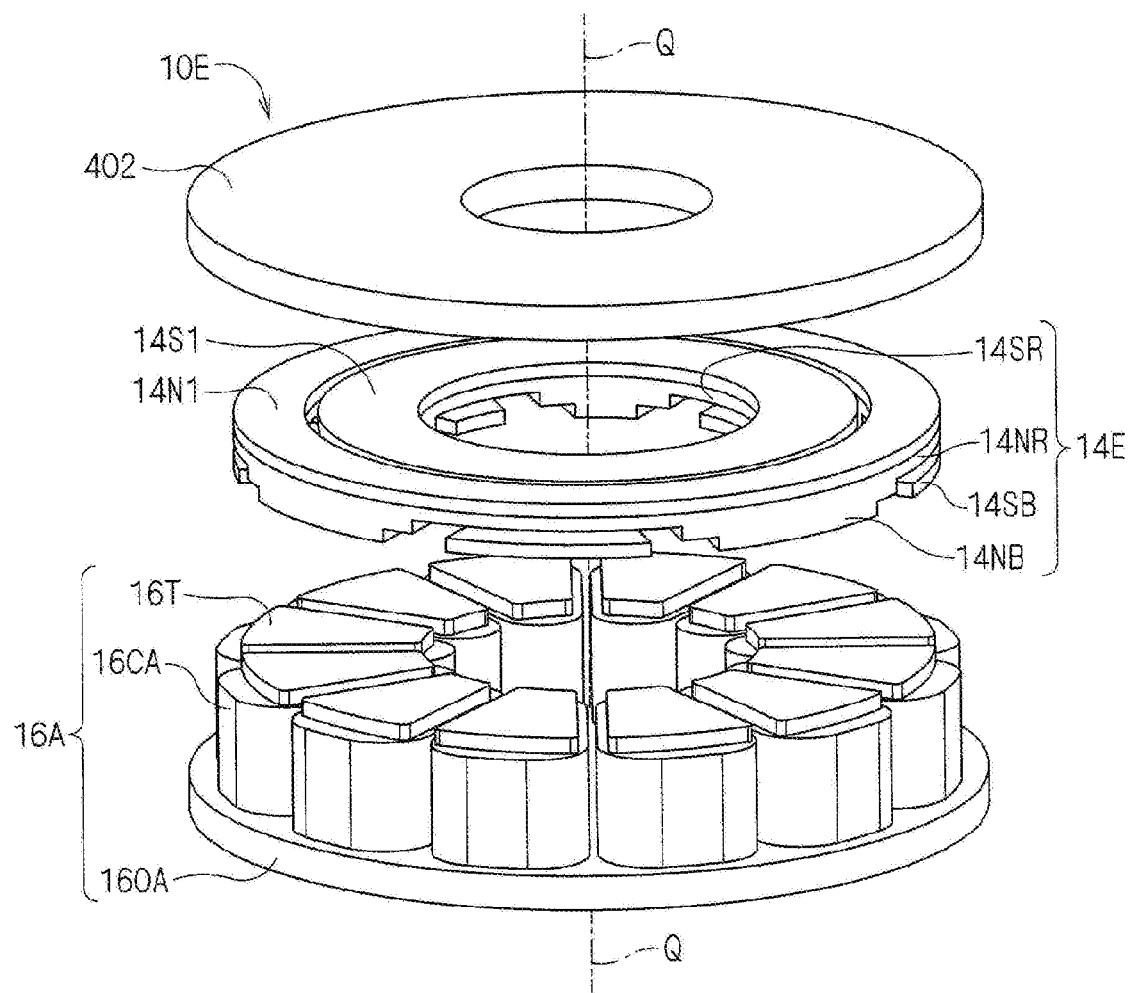
F I G. 3 8
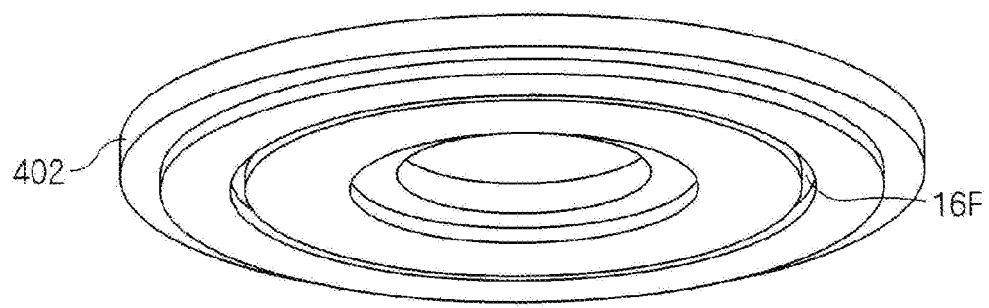

AIR CONDITIONER, AIR CONDITIONER MANUFACTURING METHOD, AND COMPRESSOR

TECHNICAL FIELD

The present invention relates to an air conditioner which performs a heating operation, and to a compressor.

BACKGROUND ART

An air conditioner requires a particularly high heating capability, and is designed so as to exert the maximum capacity at a time when a heating operation at a low temperature is started. However, normally, a high heating capability is not so required in a long-term operation. The same applies to cooling. Thus, it is not necessary to particularly increase the ability of a motor in a long-term operation. Especially, a load in a long-term operation state is decreasing year by year because of improved thermal insulation of a building. Accordingly, if designing is made so as to satisfy requisitions for the heating capability at a high-load time, an operating efficiency at a time of the long-term operation is deteriorated. In other words, from the viewpoint of energy saving, it is desired to improve particularly a motor efficiency at a low load, to thereby improve an APF (Annual Performance Factor; efficiency of energy consumption efficiency through a year) of the motor.

To improve the motor efficiency at the low load while requiring a heating capability of a high load such as when the heating operation at a low temperature is started, it is conceivable to utilize a boosting of a power source. Others have been also proposed, including a technique of utilizing a magnetic flux weakening control by shifting a phase of a motor current (Japanese Patent No. 3021947), a technique of utilizing a piece of iron which short-circuits a magnetic flux of a magnet (Japanese Patent Application Laid-Open No. 11-275789 (1999)), a technique of utilizing a field control coil (Japanese Patent Application Laid-Open No. 2006-141106), and the like. Also proposed is a technique of using a magnetic flux weakening control and a boosting separately for a heating operation and a cooling operation (Japanese Patent Application Laid-Open No. 2006-313023).

DISCLOSURE OF THE INVENTION

Problems to be Solved by the Invention

In a magnetic flux weakening control in which a phase of a motor current is shifted, the stability of the control is decreased, and an operating range is not considerably expanded. Additionally, a copper loss is increased due to a current (a so-called d-axis current) for magnetic flux weakening.

In the technique utilizing the boosting of the power source, a circuit is complicated to increase a circuit preparation cost and increase the number of production steps. Moreover, in a case of an excessively high voltage, an insulation structure needs to be strengthened.

In the technique utilizing the piece of iron which short-circuits the magnetic flux, a mechanical movable portion is provided, which reduces reliability due to an error in the size of a component part, a mistake in an assembly process. There is also a problem in ensuring an accurate operation of the movable portion.

To weaken a field only by a field control coil, a large current has to be flown therein.

In view of the above-mentioned techniques, an object of the present invention is to provide a technique which realizes a heating operation at a time of a high load.

Means for Solving the Problems

To solve the problems described above, a first aspect of the present invention is an air conditioner (100) capable of a heating operation and comprising a compressor (30; 30A, 30R) which compresses a cooling medium and in which mounted is a motor (10A, 10R) including a rotor (14A, 14R) and a stator (16A, 16R), the rotor having a plurality of rare-earth magnets (14MA, 14MR) rotatable in a circumferential direction around a shaft (12) extending in a direction of a rotation axis (Q), the stator having an armature winding (16CA, 16CR) opposed to the rotor, wherein in case of a heating high-load operation which is the heating operation and in which the motor drives the compressor with the number of rotations equal to or greater than a predetermined number of rotations, a harmonic current flows in the armature winding to induction-heat the rare-earth magnets.

In a second aspect of the present invention based on the first aspect: the air conditioner is further capable of a cooling operation; in a case where the motor (10A, 10R) performs the heating high-load operation, the induction heating is performed; in a case where, in the cooling operation, a cooling high-load operation is performed in which the motor drives the compressor with the number of rotations equal to or greater than a predetermined number of rotations, a magnetic flux weakening control by means of a current-phase advance is performed.

In a third aspect of the present invention based on the first aspect: the air conditioner is further capable of a cooling operation; the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; in a case where the motor (10A, 10R) performs the heating high-load operation, the induction heating is performed; in a case where, in the cooling operation, a cooling high-load operation is performed in which the motor drives the compressor with the number of rotations equal to or greater than a predetermined number of rotations, a voltage of the DC link part is boosted by the converter.

In a fourth aspect of the present invention based on the first aspect: the air conditioner is further capable of a cooling operation; the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; a duty of an output signal outputted from the PWM inverter in the heating high-load operation is lower than a duty of an output signal outputted from the PWM inverter to the motor in a cooling high-load operation which is the cooling operation and in which the motor drives the compressor with the number of rotations equal to or greater than a predetermined number of rotations; a voltage of the DC link part (56) of the inverter in the heating high-load operation is higher than a voltage of the DC link part in the cooling high-load operation.

In a fifth aspect of the present invention based on the first or second aspect: the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; the inverter passes a sinusoidal wave current to the motor (10A, 10R) except in the heating high-load operation, and supplies an overmodulated current in the heating high-load operation.

In a sixth aspect of the present invention based on the first or second aspect: the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; the inverter passes a square wave current to the armature winding in the heating high-load operation, and passes a sinusoidal wave current except in the heating high-load operation.

In a seventh aspect of the present invention based on the sixth aspect, in the heating high-load operation, the PWM inverter (54) passes and superimposes, to the armature winding (16CA, 16CR), a harmonic current in a non-conducting time zone of the square wave passage.

In an eighth aspect of the present invention based on the first or second aspect: the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; a carrier frequency of the inverter in the heating high-load operation is higher than a carrier frequency except in the heating high-load operation.

In a ninth aspect of the present invention based on any one of the first to sixth aspects and the eighth aspect, a non-conducting time zone is provided in power feeding to the motor (10A, 10R), and an induced voltage by the motor is measured in the non-conducting time zone, and a main magnetic flux ($\phi a$) of the motor is estimated based on the induced voltage.

In a tenth aspect of the present invention based on the ninth aspect, the non-conducting time zone is provided in a predetermined period including a time at which the induced voltage reaches a local maximum based on a history of the induced voltage of a current supplied to the armature winding.

In an eleventh aspect of the present invention based on the ninth aspect, the motor is a multi-phase motor, and the non-conducting time zone is provided in a predetermined period including a time at which the induced voltage reaches a local maximum based on a previous history of each phase of a current supplied to the armature winding.

In a twelfth aspect of the present invention based on any one of the ninth to eleventh aspects, a coefficient (kq) for correcting reduction of a q-axis inductance (Lq) of the motor is corrected based on the estimated field magnetic flux ($\phi a$).

In a thirteenth aspect of the present invention based on any one of the ninth to twelfth aspects, when reduction of the induced voltage becomes equal to or greater than a predetermined threshold value after the induction heating is started, the induction heating is stopped.

In a fourteenth aspect of the present invention based on any one of the first to eighth aspects, the air conditioner further comprises a temperature sensor (62) near a discharge pipe of the cooling medium, and when a temperature measured by the temperature sensor is equal to or higher than a predetermined threshold value, the induction heating is not performed.

In a fifteenth aspect of the present invention based on the first or second aspect: the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; the induction heating is stopped in a case where, after the induction heating is started, an increase of a current supplied to the armature winding in accordance with a torque command value to the motor (10A, 10R) of the inverter is equal to or greater than a predetermined threshold value.

In a sixteenth aspect of the present invention based on any one of the first to eighth aspects, the air conditioner further comprises a winding temperature sensor (64) which detects a winding temperature of the armature winding (16CA, 16CR), and the induction heating is not performed in a case where a temperature measured by the winding temperature sensor is equal to or higher than a predetermined threshold value.

In a seventeenth aspect of the present invention based on any one of the first to twelfth aspects, the air conditioner further comprises a timer (66) which measures a time period elapsed since the induction heating is started, and the induction heating is stopped after the timer measures a predetermined time period.

In an eighteenth aspect of the present invention based on any one of the first to twelfth aspects, a start of the induction heating is suspended after recovery from an instantaneous stop.

In a nineteenth aspect of the present invention based on the first or second aspect: the air conditioner further comprises an inverter (50) having a converter (52), a PWM inverter (54), and a DC link part (56), the converter (52) converting an alternate current supplied from a power source into a direct current, the PWM inverter (54) converting the direct current obtained from the converter into an alternate current and supplying the alternate current to the armature winding (16CA, 16CR), the DC link part (56) connecting the converter and the PWM inverter to each other; the air conditioner obtains the number of rotations of the rotor (14) based on a voltage of the DC link part and a current flowing in the motor (10A, 10R), and a start of the induction heating is suspended until a variation of the number of rotations per unit time becomes equal to or smaller than a predetermined threshold value.

In a twentieth aspect of the present invention based on any one of the first to nineteenth aspects: the rotor (14) has a rotor core (140A, 140R); the stator (16A, 16R) has a stator core (160A, 160R); an iron loss of a material of the stator core is smaller than that of the rotor core.

In a twenty-first aspect of the present invention based on the twentieth aspect: the rotor (14) has a plurality of first electromagnetic steel plates extending in a plane whose normal line is the rotation axis (Q); the stator (16A, 16R) has a plurality of second electromagnetic steel plates extending in the plane; the thickness of one of the first electromagnetic steel plates with respect to the direction of the rotation axis is larger than the thickness of one of the second electromagnetic steel plates with respect to the direction of the rotation axis.

In a twenty-second aspect of the present invention based on the twentieth or twenty-first aspect: either one of a silicon steel plate or an iron-dust core is adopted as a material of the rotor core (140A, 140R); any one of amorphous, ferritic core, and permalloy is adopted as a material of the stator core (160A, 160R).

In a twenty-third aspect of the present invention based on any one of the first to twenty-second aspects: the stator (16A, 16R) is fixed within a container (32) of the compressor (30; 30A, 30R); the container is provided with a heat dissipation fin (34) at a position corresponding to a position where the stator is fixed.

In a twenty-fourth aspect of the present invention based on any one of the first to twenty-second aspects: the motor (10A) is an axial gap type motor; the compressor (30A) has a compressor mechanism section (36) which compresses the cooling medium, and a container (32) which houses therein the compressor mechanism section and the motor and presents a high-pressure dome; the stator (16A) is provided at a the compressor mechanism section (36) side in the container (32); the compressor further includes a low-pressure cooling-medium jacket (38) which is in contact with surroundings of the compressor mechanism section within the high-pressure dome of the container or in contact with the stator having the armature winding (16CA).

In a twenty-fifth aspect of the present invention based on any one of the first to twenty-second aspects: the motor (10A) is an axial gap type motor; an air-cored coil (16CS) is adopted as the armature winding (16CA).

In a twenty-sixth aspect of the present invention based on the twenty-fifth aspect, the rotors (14A) are opposed to each other with the stator (16A) being interposed therebetween in the direction of the rotation axis (Q).

In a twenty-seventh aspect of the present invention based on the twenty-sixth aspect, the air-cored coil (16CS) is formed of a rectangular wire having self-adhesiveness.

In a twenty-eighth aspect of the present invention based on the twenty-sixth aspect, the air-cored coil (16CS) is shaped with a heat-resistant resin and a fiber filler.

In a twenty-ninth aspect of the present invention based on any one of the twentieth to twenty-second aspects, a harmonic absorption material (20A) which is an insulator (20) is arranged between the armature winding (16CA, 16CR) and the stator core (160A, 160R).

In a thirtieth aspect of the present invention based on any one of the first to twenty-ninth aspects, the rare-earth magnets (14MA, 14MR) are arranged on a surface of a rotor core (140A, 140R) included in the rotor (14).

In a thirty-first aspect of the present invention based on any one of the twentieth to twenty-third aspects and the twenty-ninth aspect: the motor (10R) is a radial gap type motor; the armature winding (16CR) is wound in a distributed winding form or a wave winding form; at least one of coil ends (16CE) of the armature winding protrudes toward an end portion of the rotor core (140R) with respect to the direction of the rotation axis (Q); an end portion of the rare-earth magnet (14MR) is opposed to the coil end without interposition of the rotor core.

In a thirty-second aspect of the present invention based on the thirty-first aspect, a self-adhesive material is adopted for the armature winding (16CR).

In a thirty-third aspect of the present invention based on the thirty-second aspect, a rectangular wire is adopted for the armature winding (16CA, 16CR).

A thirty-fourth aspect of the present invention is a method for manufacturing any one of the thirty-first to thirty-third aspects, and is a method for manufacturing the air conditioner, comprising the step of arranging the rotor core (140R) and then shaping an coil end which is an end portion of the armature winding (16CR) with respect to the direction of a rotation axis (Q).

A thirty-fifth aspect of the present invention is a method for manufacturing the thirty-second or thirty-third aspect, and is a method for manufacturing the air conditioner, comprising the steps of arranging the rotor core (140R) and then shaping an coil end of the armature winding (16CR); and after shaping the coil end, making adhesion of the self-adhesiveness material.

A thirty-sixth aspect of the present invention is a method for manufacturing any one of the thirty-first to thirty-third aspects, and is a method for manufacturing the air conditioner, comprising a first step of arranging teeth (16T) around the rotor (14) in a state where the rotor is arranged, the stator core (160R) including the teeth (16T) and a yoke (16Y); a second step of winding the armature winding (16CR) on the teeth arranged in the first step; a third step of connecting the yoke and the teeth to each other after the second step.

In a thirty-seventh aspect of the present invention based on any one of the thirty-first to thirty-third aspects, in the coil end (16CE), only an end portion at one side with respect to the direction of the rotation axis (Q) protrudes toward the rotation axis.

In a thirty-eighth aspect of the present invention based on the thirty-seventh aspect, the protruding coil end (16CE) is provided at the compressor mechanism section (36) side in the compressor (30; 30A, 30R).

In a thirty-ninth aspect of the present invention based on any one of the thirty-first to thirty-third aspects, the motor (10R) is an inner rotor type motor, and the coil end (16CE) is in the shape of a line segment in an overhead view in the direction of a rotation axis (Q).

In a fortieth aspect of the present invention based on the thirty-first aspect, the rare-earth magnet (14MA, 14MR) protrudes from the rotor core (140A, 140R) toward the direction of the rotation axis (Q).

In a forty-first aspect of the present invention based on the fortieth aspect: an insulator (20) is arranged at an end portion of the stator core (160A, 160R) with respect to the direction of the rotation axis (Q) and between the coil end (16CE) and the stator core; the insulator protrudes toward the rotor side as compared with the stator (16A, 16R).

In a forty-second aspect of the present invention based on the fortieth aspect: the rotor core (140R) includes a pair of end plates (142T, 142B) extending in a plane whose normal line is in the direction of the rotation axis at end portions with respect to the direction of the rotation axis (Q), and a plurality of first electromagnetic steel plates interposed between the end plates and laminated in the direction of the rotation axis; each of the end plates includes a hole (144) which is smaller than the maximum cross-sectional area of the rare-earth magnet (14MR) in a plane whose normal line is in the direction of the rotation axis and in which the first electromagnetic steel plates are located; the rare-earth magnet presents, at an end portion thereof with respect to the direction of the rotation axis, a step engageable with the hole.

In a forty-third aspect of the present invention based on the thirty-first aspect: the rotor core (140R) includes end plates (142T, 142B) extending in a plane whose normal line is in the direction of the rotation axis at end portions with respect to the direction of the rotation axis (Q), and a plurality of first electromagnetic steel plates interposed between the end plates and laminated in the direction of the rotation axis; a material whose heat capacity is smaller than a heat capacity of the rare-earth magnet is adopted for the end plate; the coil end (16CE) is opposed to the rare-earth magnet (14MR) with interposition of the end plate.

In a forty-fourth aspect of the present invention based on the forty-third aspect: a first thermal insulator whose heat capacity is larger than that of the rotor core is provided between the rotor core (140R) and the rare-earth magnet (14MR); a second thermal insulator whose heat capacity is larger than that of the rotor core is provided between the rotor core and the end plates (142T, 142B).

In a forty-fifth aspect of the present invention based on any one of the first to twenty-ninth aspects: the motor (10B) is an axial gap type motor; the armature winding (16CB) is wound in a distributed winding form; a portion of the armature winding at an outer circumference side thereof is curved toward an outer edge end portion of the rare-earth magnet (14MA).

In a forty-sixth aspect of the present invention based on the forty-fifth aspect, a self-adhesive material is adopted for the armature winding (16CB).

In a forty-seventh aspect of the present invention based on the forty-sixth aspect, a rectangular wire is adopted for the armature winding (16CB).

A forty-eighth aspect of the present invention is a method for manufacturing the forty-sixth or forty-seventh aspect, and is a method for manufacturing air conditioner, comprising a first step of shaping the armature winding (16CB), and a second step of making adhesion of the self-adhesiveness material.

In a forty-ninth aspect of the present invention based on the forty-fifth aspect: the stator (16A) is, at the outer circumference side thereof, held within a container (32) of the compressor (30A); a portion of a coil end (16CE) of the armature winding (16CA) at the outer circumference side is curved toward the rotor (14) opposed to the stator in the direction of the rotation axis (Q).

In a fiftieth aspect of the present invention based on the forty-ninth aspect, a portion of the coil end (16CE) at the inner circumference side is curved toward the direction of the rotation axis (Q).

In a fifty-first aspect of the present invention based on the forty-ninth aspect, a portion of the coil end (16CE) at the inner circumference side extends in a plane whose normal line is in the direction of the rotation axis (Q).

In a fifty-second aspect of the present invention based on the forty-fifth aspect, at the side opposed to the armature winding (16C), an end portion of the rare-earth magnet (14MA, 14MR) at the outer circumference side in a radial direction around the rotation axis is exposed in a plane whose normal line is in the direction of the rotation axis (Q).

In a fifty-third aspect of the present invention based on the forty-fifth aspect, the rare-earth magnets (14MA, 14MR) are held by a non-magnetic holder.

In a fifty-fourth aspect of the present invention based on any one of the first to twenty-ninth aspects: the motor (10R) is a radial gap type motor; one of the rare-earth magnets (14MR) has a plurality of magnet bodies (14Mp), and is buried in a rotor core (140R) included in the rotor (14); one of the plurality of magnet bodies has a coercive force higher than a coercive force of another of the magnet bodies arranged closer to the rotation axis (Q) than the one magnet body is.

In a fifty-fifth aspect of the present invention based on the fifty-fourth aspect, one of the rare-earth magnets (14MA, 14MR) includes the plurality of magnet bodies (14Mp) arranged substantially in the same plane which is parallel to the rotation axis (Q).

In a fifty-sixth aspect of the present invention based on the fifty-fourth aspect, in one of the rare-earth magnets (14MA, 14MR), the plurality of magnet bodies (14Mp) are arranged so as to present a recessed shape opening toward the stator, when viewed in a cross section whose normal line is in the direction of the rotation axis (Q).

In a fifty-seventh aspect of the present invention based on the fifty-fourth aspect, a third thermal insulator (22; 22S, 22C) whose heat capacity is larger than that of the magnet bodies is provided between one and another of the plurality of magnet bodies (14Mp).

In a fifty-eighth aspect of the present invention based on the fifty-seventh aspect, a resin spacer (22S) is adopted for the third thermal insulator (22).

In a fifty-ninth aspect of the present invention based on the fifty-seventh aspect, a resin coating (22C) covering the magnet bodies (14Mp) is adopted for the third thermal insulator (22).

In a sixtieth aspect of the present invention based on the fifty-seventh aspect, a space (14Ig) provided between ones of the plurality of magnet bodies (14Mp) is adopted for the third thermal insulator (14I).

In a sixty-first aspect of the present invention based on any one of the first to twenty-ninth aspects: the motor (10R) is a radial gap type motor; one of the rare-earth magnets (14MA, 14MR) has a plurality of magnet bodies (14Mp) buried in a rotor core (140A, 140R) included in the rotor (14); in the one of the rare-earth magnets, a distance between end points of the plurality of magnet bodies at a the stator side is longer than a distance between end points thereof at a side opposite to the stator.

In a sixty-second aspect of the present invention based on any one of the first to twenty-ninth aspects: the rare-earth magnets (14MA, 14MR) are buried in a rotor core (140A, 140R) included in the rotor (14); a high thermal conductivity resin (24) is arranged between the rare-earth magnet and a side surface of the rotor core.

In a sixty-third aspect of the present invention based on any one of the first to twenty-ninth aspects: the rare-earth magnets (14MA, 14MR) are buried in a rotor core (140A, 140R) included in the rotor (14); aluminum is arranged between the rare-earth magnet and a side surface of the rotor core by die-casting.

In a sixty-fourth aspect of the present invention based on any one of the first to twenty-ninth aspects, a flow line of the cooling medium flowing in the compressor (30; 30A, 30R) is substantially in parallel with a cooling medium passage (30P) which is in contact with the rare-earth magnets.

In a sixty-fifth aspect of the present invention based on the sixty-fourth aspect: the motor (10R) is a radial gap type motor; the rotor (14) further comprises a rotor core (140R) in which the rare-earth magnets (14MR) are buried and which extends in parallel with the rotation axis (Q); a space (142) is provided in the rotor core so as to expose an end portion of each of the rare-earth magnets at a side of a side surface of the rotor core; the cooling medium flows in the space.

In a sixty-sixth aspect of the present invention based on the sixty-fourth aspect: the motor (10R) is a radial gap type motor; the rotor (14R) further comprises a rotor core (140R)

which arranges the rare-earth magnets (14MR) in an exposed manner; the cooling medium flows in an air gap (10G) of the radial gap type motor.

In a sixty-seventh aspect of the present invention based on the sixty-fifth or sixty-sixth aspect: the compressor (30; 30A, 30R) includes a compressor mechanism section (36) having a discharge port (42); a distance between the rotation axis and the discharge port in a plane whose normal line is in the direction of the rotation axis (Q) is equal to or shorter than a distance between the rotation axis and the cooling medium passage in the plane.

In a sixty-eighth aspect of the present invention based on any one of the first to twenty-ninth aspects: the shaft (12) has a through hole (12H) extending in the direction of the rotation axis (Q); the through hole is branched in a direction passing through the rotor (14).

A sixty-ninth aspect of the present invention is an air conditioner (100) which compresses a cooling medium using a motor (10C) including a rotor (14C), a rare-earth magnet (14N, 14S; 14N1, 14S1), a first stator (16A), and a second stator (402), and which is capable of a heating operation and a cooling operation, the rotor being rotatable in a circumferential direction around a shaft (12) extending in a direction of a rotation axis (Q) and having magnetic poles whose polarities alternate with each other in the circumferential direction, the rare-earth magnet (14N, 14S; 14N1, 14S1) supplying a field magnetic flux to the magnetic poles, the first stator being opposed to the rotor with respect to the direction of the rotation axis and having an armature winding (16CA), the second stator having a magnetic plate opposed to the rotor from a side opposite to the first stator and having a field control winding (16F) which controls the field magnetic flux; in a case of a heating high-load operation which is the heating operation and in which the motor is rotated with the number of rotations equal to or greater than a predetermined number of rotations to compress the cooling medium, a harmonic current is passed to the field control winding to induction-heat the rare-earth magnet, and in a case of a cooling high-load operation which is the cooling operation and in which the motor is rotated with the number of rotations equal to or greater than a predetermined number of rotations to compress the cooling medium, a current is passed to the field control winding to weaken the field magnetic flux.

In a seventieth aspect of the present invention based on the sixty-ninth aspect, a plurality of the rare-earth magnets (14N, 14S) are provided in the rotor (14C) so as to present magnetic poles whose polarities alternate with each other in the circumferential direction.

In a seventy-first aspect of the present invention based on the sixty-ninth aspect, the rotor (14C) having a first magnetic ring (14NR), a second magnetic ring (14SR), a plurality of first magnetic plates (14NB), and a plurality of second magnetic plates (14SB), the first magnetic ring receiving an N-pole field magnetic flux from the rare-earth magnet (14N) and being provided around the rotation axis (Q), the second magnetic ring receiving an S-pole field magnetic flux from the rare-earth magnet (14S) and being provided around the rotation axis, the first magnetic plates being annularly arranged in the circumferential direction so as to be opposed to the first stator (16A) and being magnetically coupled with each other by the first magnetic ring and being magnetically separated from the second magnetic ring, the second magnetic plates being annularly arranged in the circumferential direction so as to be opposed to the first stator and being magnetically coupled with each other by the second magnetic ring and being magnetically separated from the first magnetic ring.

In a seventy-second aspect of the present invention based on the seventy-first aspect, the rare-earth magnet has a first magnet (14N1) and a second magnet (14S1), and is provided in the rotor (14C), the first magnet having a first magnetic pole surface (14NP) which supplies the N-pole field magnetic flux to the first magnetic ring (14NR), the second magnet (14S1) having a second magnetic pole surface (14SP) which supplies the S-pole field magnetic flux to the second magnetic ring (14SR).

In a seventy-third aspect of the present invention based on the seventy-first aspect, the rare-earth magnet (14N1, 14S1) has a first magnetic pole surface and a second magnetic pole surface, and is provided in the second stator (402), the first magnetic pole surface supplying the N-pole field magnetic flux to the first magnetic ring, the second magnetic pole surface supplying the S-pole field magnetic flux to the second magnetic ring.

A seventy-fourth aspect of the present invention is an air conditioner (100) capable of a heating operation and including a compressor (30; 30A, 30R) which compresses a cooling medium and in which mounted is a motor (10A, 10R) including a rotor (14A, 14R) and a stator (16A, 16R), the rotor having a plurality of rare-earth magnets (14MA, 14MR) rotatable in a circumferential direction around a shaft (12) extending in a direction of a rotation axis (Q), the stator having an armature winding (16CA, 16CR) opposed to the rotor, wherein: an auxiliary winding (18) near the rare-earth magnets is further provided; in a case of a heating high-load operation which is the heating operation and in which the motor drives the compressor with the number of rotations equal to or greater than a predetermined number of rotations, a harmonic current is flown in the auxiliary winding to induction-heat the rare-earth magnets.

In a seventy-fifth aspect of the present invention based on the seventy-fourth aspect: the motor (10A) is an axial gap type motor; and the auxiliary winding (18) is arranged at the outer circumference side of the rotor (14A).

In a seventy-sixth aspect of the present invention based on the seventy-fourth aspect: the motor (10R) is a radial gap type motor; the auxiliary winding (18) is provided near the rare-earth magnet (14MA) at an end portion of the rotor (14A) with respect to the direction of the rotation axis (Q).

In a seventy-seventh aspect of the present invention based on the seventy-fourth aspect: the motor (10A) is an axial gap type motor; a pair of the stators (16A) are provided so as to interpose the rotor (14A) therebetween in the direction of the rotation axis (Q); one of the stators has a stator core (160A) in which an armature winding (16CA) is arranged, and the other of the stators has a stator core in which the auxiliary winding (18) is arranged at the rotor side.

Effects of the Invention

According to the first aspect, the residual magnetic flux density of the rare-earth magnet is weakened by the induction heating, thereby enabling a high-speed driving, and a cooling medium is flown near the rare-earth magnet so that the temperature of the cooling medium rises. This can contribute to the heating operation at a time of a high load.

According to the second aspect, since the magnetic flux weakening control is performed by a current-phase advance at the time of the cooling high-load operation, the number of rotations of the motor can be increased without excessively raising the temperature of the cooling medium.

According to the third aspect, the voltage applied to the motor is increased at the time of the cooling high-load operation, the number of rotations of the motor can be increased without excessively raising the temperature of the cooling medium.

According to the a fourth aspect, the duty is made small and the voltage of the DC link part is made high at the time of the heating operation, thereby a harmonic component of the current is increased to contribute to the induction heating.

According to the fifth or sixth aspect, a harmonic component of the current flowing in the armature winding is increased to contribute to the induction heating.

According to the seventh aspect, the harmonic component of the current flowing in the armature winding is further increased.

According to the eighth aspect, the frequency of the harmonic current is increased to contribute to the induction heating.

According to the ninth aspect, by measuring the induced voltage, the field magnetic flux can be estimated based on a relationship between the induced voltage and the number of rotations of the motor, thus allowing a sensorless operation to be performed even when the thermal demagnetization occurs.

According to the tenth aspect, since the non-conducting time zone is provided near a local maximum value of the induced voltage, occurrence of an error in the estimation of the field magnetic flux can be avoided or suppressed.

According to the eleventh aspect, occurrence of an error in the estimation of the field magnetic flux can be avoided or suppressed more effectively.

According to the twelfth aspect, the non-conducting time zone can more surely be provided.

According to the thirteenth aspect, the temperature of the rare-earth magnet can be estimated by measuring the induced voltage. Thus, the irreversible demagnetization can be avoided or suppressed by stopping the induction heating in a case where the induced voltage is reduced to or beyond a predetermined threshold value.

According to the fourteenth aspect, since the temperature of the rare-earth magnet can be estimated based on the temperature of the cooling medium, the irreversible demagnetization can be avoided or suppressed.

Since the current supplied to the armature winding in accordance with the torque command value increases as the field magnetic flux decreases, according to the fifteenth aspect, the irreversible demagnetization can be avoided or suppressed.

According to the sixteenth aspect, since the temperature of the rare-earth magnet can be estimated based on the temperature of the armature winding, the irreversible demagnetization can be avoided or suppressed.

According to the seventeenth aspect, excessive induction heating can be avoided or suppressed, and thus the irreversible demagnetization can be avoided or suppressed.

If the rare-earth magnet is demagnetized at a time of start-up, the field magnetic flux is reduced to make the operation of the compressor instable. It can be also considered that the field magnetic flux is reduced to make the operation of the compressor instable immediately before the irreversible demagnetization occurs immediately before the start-up. According to the eighteenth aspect, the induction heating is not performed after the recovery from the instantaneous stop, and thereby the irreversible demagnetization can be avoided or suppressed.

According to the nineteenth aspect, the operation of the compressor can be stabilized.

According to the twentieth aspect, overheating of the armature can be avoided or suppressed even though the induction heating is performed.

According to the twenty-first aspect, overheating of the stator can be avoided or suppressed even though the induction heating is performed.

According to the twenty-second aspect, an iron loss of the stator core is small.

According to the twenty-third aspect, heat of the stator can be dissipated, and thus overheating thereof can be avoided or suppressed.

According to the twenty-fourth aspect, the stator is cooled, and thus overheating thereof can be avoided or suppressed.

According to the twenty-fifth aspect, since teeth are not provided, the rotor can be efficiently induction-heated.

According to the twenty-sixth aspect, an air-cored coil can be easily adopted.

According to the twenty-seventh and twenty-eighth aspects, forming of the air-cored coil is easy, and the rotor can be efficiently heated.

According to the twenty-ninth aspect, overheating of the armature can be avoided or suppressed.

According to the thirtieth aspect, the rare-earth magnet can be efficiently heated without being hindered by the rotor core.

According to the thirty-first aspect, the rare-earth magnet provided in the rotor can be efficiently heated.

According to the thirty-second and thirty-third aspects, shaping of the coil end is easy.

According to the thirty-fourth and thirty-fifth aspects, manufacturing of the motor of the thirty-second aspect is easy.

According to the thirty-sixth and thirty-seventh aspects, manufacturing of the motor of the thirty-first aspect is easy.

According to the thirty-eighth aspect, manufacturing of the compressor is easy.

According to the thirty-ninth aspect, shaping of the coil end is easy.

According to the fortieth aspect, the magnet can be efficiently heated.

According to the forty-first aspect, a creepage distance of insulation can be extended.

According to the forty-second aspect, the rare-earth magnet can be efficiently induction-heated while the lamination of the first electromagnetic steel plates is maintained using the end plates.

According to the forty-third aspect, since the material whose heat capacity is smaller than that of the rare-earth magnet is adopted for the end plates of the rotor core, the rare-earth magnet can be heated even though the end plates are used.

According to the forty-fourth aspect, heat diffusion to the rotor core is avoided or suppressed, and the rare-earth magnet can be efficiently heated.

According to the forty-fifth aspect, the rare-earth magnet can be efficiently heated.

According to the forty-sixth to forty-eighth aspects, shaping of the coil end is easy.

According to the forty-ninth aspect, since the armature winding becomes close to the rare-earth magnet arranged in the rotor, the magnet can be efficiently heated. Moreover, since the stator is held at the outer circumference side, heat of the stator can be dissipated by adopting a material having an appropriate heat capacity as a material of the container.

According to the fiftieth aspect, imbalance of the magnetic flux in the radial direction around the rotation axis in a plane whose normal line is in the direction of the rotation axis can be eliminated.

According to the fifty-first aspect, a resistance caused by bending of the coil end according to the forty-ninth aspect can be reduced.

According to the fifty-second aspect, the rare-earth magnet can be efficiently heated.

According to the fifty-third aspect, the rare-earth magnet can be held against a centrifugal force without deteriorating the heating efficiency.

According to the fifty-fourth aspect, the irreversible demagnetization of the rare-earth magnet can be avoided or suppressed.

According to the fifty-fifth aspect, arrangement of the rare-earth magnet is easy.

According to the fifty-sixth aspect, since another magnet body is located at a distance from the stator, the irreversible demagnetization thereof can be avoided or suppressed more effectively.

According to the fifty-seventh aspect, heat transfer from one magnet body to another magnet body is hindered, and the irreversible demagnetization of the rare-earth magnet can be avoided or suppressed.

According to the fifty-eighth and fifty-ninth aspects, hindrance of heat transfer and fixing of magnet bodies can be obtained at once.

According to the sixtieth aspect, the magnet bodies can be cooled by the cooling medium or a ventilation flow flowing in the space.

According to the sixty-first aspect, the end points of the plurality of magnet bodies exist at the side closer to the stator, the effect of the induction heating can be exerted on the magnet.

According to the sixty-second aspect, thermal conductivity between the rare-earth magnet and the rotor core can be increased, and thus the rare-earth magnet can be efficiently heated.

According to the sixty-third aspect, thermal conductivity between the rare-earth magnet and the rotor core can be increased, and thus the rare-earth magnet can be efficiently heated.

According to the sixty-fourth aspect, heat of the rare-earth magnet can be effectively recovered by the cooling medium.

According to the sixty-fifth aspect, the space functions as a magnetic barrier which prevents the magnetic flux of the rare-earth magnet from flowing in short circuit in the rotor core, and also functions as a passage through which the cooling medium recovers heat of the rare-earth magnet.

According to the sixty-sixth aspect, heat of the rare-earth magnet can be effectively recovered.

According to the sixty-seventh aspect, the cooling medium can be efficiently guided to the vicinity of the rare-earth magnet, thus contributing to efficient recovery of heat of the rare-earth magnet.

According to the sixty-eighth aspect, heat of the rare-earth magnet can be effectively recovered, and additionally contribution is made to oil separation.

According to the sixty-ninth to seventy-third aspects, since the rotor having the magnetic poles is arranged between the first stator having the armature winding and the second stator having the magnetic plate, a thrust force can be reduced. Moreover, the field control winding can serve not only for a field control but also for the induction heating.

According to the seventy-fourth to seventy-sixth aspects, by flowing the harmonic current in the auxiliary winding, the rare-earth magnet can be heated.

According to the seventy-seventh aspect, a force in the direction of the rotation axis which acts between the rotor and the pair of stators is cancelled. Moreover, since the rotor having the rare-earth magnet on which the induction heating is to be performed is provided between the auxiliary winding and one of the stators, unnecessary heating of the one of the stators can be avoided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a cross-sectional view of a compressor having the axial gap type motor mounted therein;

FIG. 5 is a diagram showing a connection between a power source and a motor;

FIG. 6 is a diagram showing a relationship between a duty of a PWM inverter output signal and a DC link part voltage;

FIG. 15 is an exploded perspective view of a part of a radial gap type motor;

FIG. 23 is a cross-sectional view of a shaft and a rotor of the axial gap type motor;

FIG. 24 is a cross-sectional view of a part of the compressor in a case where a coil end protrudes toward a rotation axis;

FIG. 32 is a plan view of the IPM rotor;

FIG. 33 is a plan view of the IPM rotor;

FIG. 37 is a diagram showing a modification of FIG. 34;

FIG. 38 is a diagram showing a part of FIG. 37;

BEST MODE FOR CARRYING OUT THE INVENTION

A basic idea of the present invention utilizes thermal demagnetization of a permanent magnet which generates a field. Generally, a permanent magnet has a property of causing a residual magnetic flux density to be reduced when receiving a heat. By heating the magnet, the residual magnetic flux density is reduced to increase the number of rotations of a motor.

The expression of an output limit speed of a motor mounted in a compressor is as follows:

[Math. 1]

$$\omega c = \frac{Vom}{\psi a - LdIam} \quad (1)$$

where:

ωc: the output limit speed (electrical angle speed);

Vom:=Vam−Ra·Iam;

Vam: a voltage limit value . . . the maximum voltage outputtable by an inverter;

Ra: a resistance of an armature winding;

Iam: a current limit value . . . corresponding to a rated current of the motor in a continuous operation;

Ψa={√(3/2)}Ψf=(√3)Ψe;

Ψf: the maximum value of an armature flux linkage of a permanent magnet per one phase;

Ψe: an effective value of the armature flux linkage of the permanent magnet; and Ld: a d-axis inductance.

Here, a d-axis represents a direction of a magnetic pole of a rotor of the motor, and a direction perpendicular thereto is represented as a q-axis.

That is, even when a control is made without unnecessarily advancing a current phase (to such a degree that the maximum torque is obtained), if the residual magnetic flux density is reduced, Ψa is also reduced so that the magnetic flux density at an operating point is reduced to increase an electrical angle speed we. Thus, a high-speed rotation is allowed without advancing the current phase which causes an instability.

Heat of the magnet is recovered by a cooling medium, and therefore can be used as heat for heating. In this technique, since the motor is operated at a high speed and additionally the cooling medium recovers the heat, a compressor is driven by a motor whose maximum capacity is smaller than the maximum capacity of a compressor which is normally necessary for the required maximum heating capability.

Figure 1:
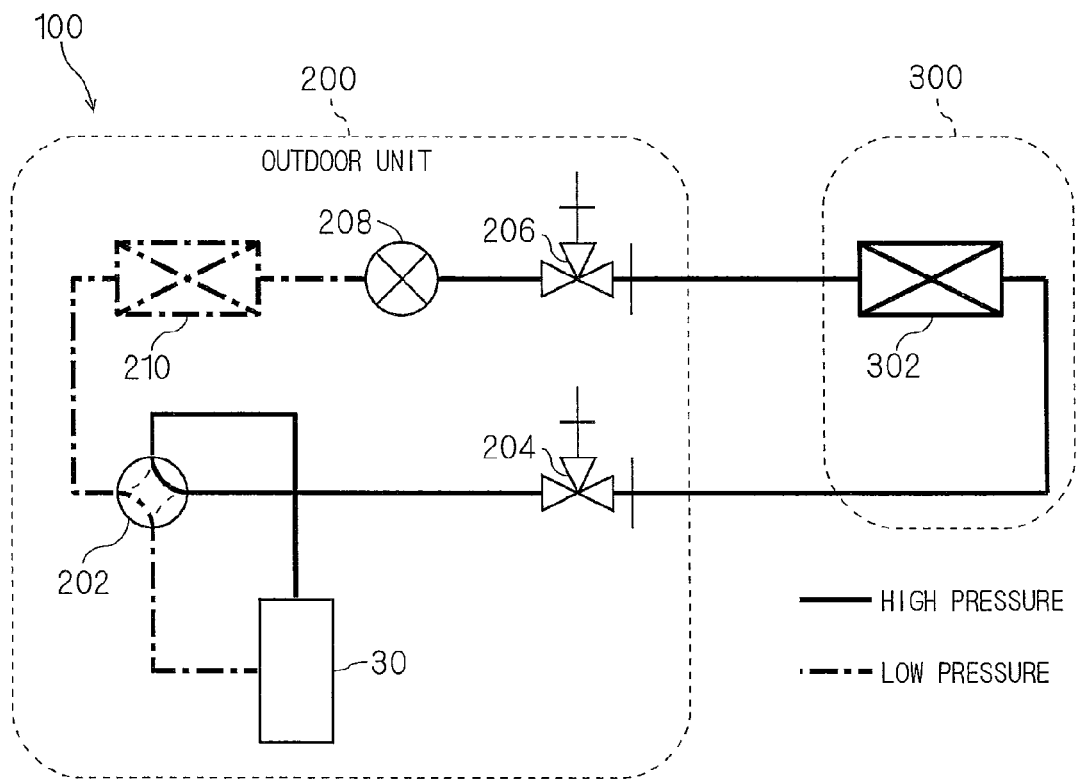
FIG. 1 is a schematic diagram showing a flow of a cooling medium at a time of a heating operation of an air conditioner.
Figure 2:
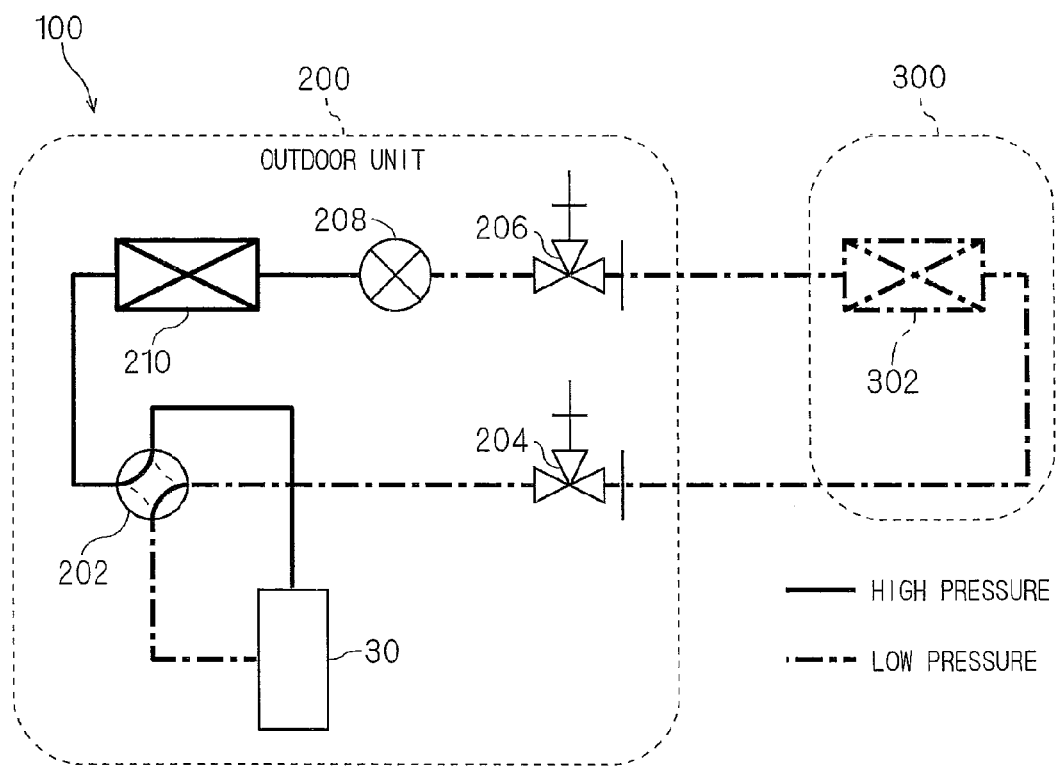
FIG. 2 is a schematic diagram showing a flow of a cooling medium at a time of a cooling operation of the air conditioner.

FIG. 1 is a schematic diagram showing a flow of the cooling medium in a cooling medium circuit at a time of the heating operation of an air conditioner, and FIG. 2 is a schematic diagram showing a flow of the cooling medium in the cooling medium circuit at a time of a cooling operation of the air conditioner. In FIG. 1 and FIG. 2, within the cooling medium circuit, parts of relatively high pressure are illustrated with solid lines, and parts of relatively low pressure are illustrated with alternate long and short dash lines.

An air conditioner 100 is broadly divided into an outdoor unit 200 and an indoor unit 300.

At the time of the heating operation, the cooling medium (gas cooling medium) compressed by a compressor 30 included in the outdoor unit 200 is sent to the indoor unit 300 via a four-way valve 202 which switches a cooling medium path, and a gas closing valve 204.

The indoor unit 300 has a heat exchanger 302. The heat exchanger 302 at the time of the heating operation functions as a condenser of the cooling medium compressed in the compressor 30. The condensed cooling medium (liquid cooling medium) is sent to a heat exchanger 210 via a liquid closing valve 206 and an electric-powered expansion valve 208 provided at the outdoor unit 200 side.

The heat exchanger 210 at the time of the heating operation functions as an evaporator of the liquid cooling medium condensed in the heat exchanger 302. The evaporated cooling medium returns to the compressor 30 via the four-way valve 202. At the time of the heating operation, the above-described cycle is repeated.

That is, at the time of the heating operation, the gas cooling medium of high temperature and high voltage is introduced to the heat exchanger 302 of the indoor unit 300, and exchanges heat with the indoor air. The gas cooling medium is condensed and rises the temperature of the indoor air, becomes a condensed cooling medium (liquid cooling medium), and is adiabatically expanded in the electric-powered expansion valve 208 to have a low temperature and low pressure, and then the cooling medium is in a gas-liquid state. The cooling medium is introduced to the heat exchanger 210 of the outdoor unit 200 and exchanges heat with the outdoor air, and consequently becomes a gas cooling medium and sucked into the compressor 30.

At the time of the cooling operation, the gas cooling medium compressed by the compressor 30 is sent to the heat exchanger 210 via the four-way valve 202. The heat exchanger 210 at the time of the cooling operation functions as a condenser of the gas cooling medium compressed in the compressor 30. The condensed liquid cooling medium is sent to the heat exchanger 302 via the electric-powered expansion valve 208 and the liquid closing valve 206.

The heat exchanger 302 at the time of the cooling operation functions as an evaporator of the liquid cooling medium condensed in the heat exchanger 210. The evaporated gas cooling medium returns to the compressor 30 via the gas closing valve 204 and the four-way valve 202. At the time of the cooling operation, the above-described cycle is repeated.

That is, at the time of the cooling operation, the gas cooling medium of high temperature and high voltage is introduced to the heat exchanger 210 of the outdoor unit 200, and exchanges heat with the outdoor air and is liquefied. The liquid cooling medium is adiabatically expanded in the electric-powered expansion valve 208 to have a low temperature and low pressure, and then in the gas-liquid state. The cooling medium is introduced to the heat exchanger 302 of the indoor unit 300 and exchanges heat with the indoor air, to lower the temperature of the indoor air. As a result, the cooling medium is vaporized and sucked into the compressor 30.

Normally, a heat exchanging cross-sectional area of the heat exchanger 210 of the outdoor unit 200 is larger than the heat exchanging cross-sectional area of the heat exchanger 302 of the indoor unit 300. Accordingly, at the time of the heating operation, a predetermined temperature difference is necessary between the cooling medium flowing in the outdoor unit 200 and the cooling medium flowing in the indoor unit 300. To ensure the temperature difference, a predetermined pressure difference is necessary between the cooling medium flowing in the outdoor unit 200 and the cooling medium flowing in the indoor unit 300. Therefore, at the time of the heating operation, a load of a motor mounted in the compressor 30 is larger than at the time of the cooling operation. Thus, the motor exerts the maximum rotation speed at the time of the heating operation.

A motor is mounted in the compressor 30, and the motor is categorized into an axial gap type and a radial gap type.

Hereinafter, firstly, as an example of a first embodiment of the present invention, a case where an axial gap type motor is mounted in the compressor 30 will be described with reference to the drawings. Next, as an example of a second embodiment of the present invention, a case where a radial gap type motor is mounted in the compressor 30 will be described with reference to the drawings. Moreover, modifications of the first and second embodiments will be shown. The following drawings starting from FIG. 1 show only elements related to the present invention.

First Embodiment

Configuration of Axial Gap Type Motor 10A

Figure 3:
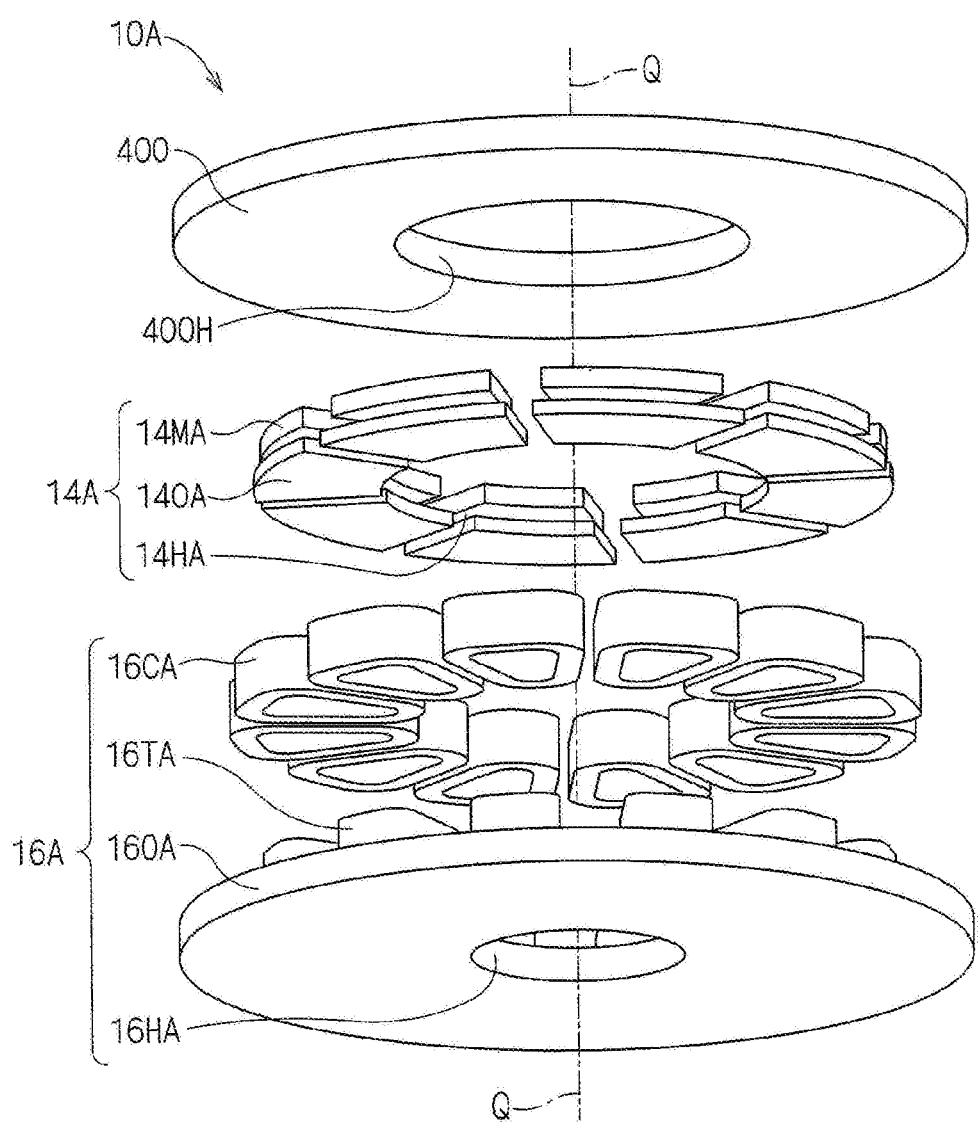
FIG. 3 is an exploded perspective view of a part of an axial gap type motor.

FIG. 3 is an exploded perspective view of an axial gap type motor 10A, as exploded along a rotation axis Q. The axial gap type motor 10A includes, for example, a rotor 14A as a field element, a stator 16A as an armature, and a magnetic body 400. In an actual configuration, the rotor 14A is interposed between the stator 16A and the magnetic body 400 with slight spaces therebetween.

The rotor 14A has a rare-earth magnet 14MA, and a rotor core 140A which covers the stator 16A side of the rare-earth magnet 14MA. The rare-earth magnet 14MA is annularly arranged around the rotation axis Q, and a hole 14HA for holding a shaft 12 (see FIG. 4) via a holder frame (not shown) made of a non-magnetic body is formed in the rotor core 140A near the rotation axis Q. Since the rare-earth magnet 14MA and the rotor core 140A are separated corresponding to each magnetic pole, they need be integrated by a non-magnetic body such as a resin. This is served by the above-mentioned holder frame.

The stator 16A has a stator core 160A, teeth 16TA held by the stator core 160A, and an armature winding 16CA.

The stator core 160A extends in a plane whose normal line is in a direction of the rotation axis Q, and has formed therein a hole 16HA through which the shaft 12 held by the rotor 14A extends. It may also be acceptable that a bearing is provided in the hole 16HA to hold the rotor 14A.

The teeth 16TA is annularly arranged around the rotation axis Q, on a main surface of the stator core 160A facing the rotor 14A among the main surfaces of the stator core 160A whose normal line is the rotation axis Q. The teeth 16TA functions as a core on which the armature winding 16CA is wound.

The armature winding 16CA is wound on the teeth 16TA via an insulator (not shown). In the present application, if not otherwise specified, the armature winding 16CA refers not to each of conductive wires constituting it, but to a collection of the conductive wires being wound. The same applies to the drawings. In the drawings, lead wires at a start and an end of the winding, and wire connections thereof are omitted.

The magnetic body 400 can be recognized as a stator having no winding. For example, a hole 400H through which the shaft 12 extends is provided near the rotation axis Q. Since a magnetic attractive force acts between the rotor 14A and the magnetic body 400, a thrust force acting between the rotor 14A and the stator 16A can be canceled. The thrust force acts on a bearing (not shown) which supports the shaft 12, and therefore a loss of the bearing can be reduced by canceling the thrust force. It may also be acceptable that the configuration of the magnetic body 400 is replaced with the same configuration as that of the stator 16A so that the stators at both sides are armatures.

<Configuration of Compressor 30A>

FIG. 4 is a cross-sectional view of a compressor 30A. The compressor 30A includes the axial gap type motor 10A, a container 32, and a compressor mechanism section 36. As for the axial gap type motor 10A, a side surface is shown. The compressor mechanism section 36 is arranged within the container 32, and the axial gap type motor 10A is arranged within the container 32 and at the upper side of the compressor mechanism section 36. The compressor mechanism section 36 is driven by the axial gap type motor 10A via the shaft 12.

An inlet pipe 41 is connected to a lower side portion of the container 32, while a discharge pipe 42 is connected to an upper portion of the container 32. A cooling medium supplied through the inlet pipe 41 is introduced into the compressor mechanism section 36. As for the inlet pipe 41 and the discharge pipe 42, too, side surfaces thereof are shown in FIG. 4.

Outer circumferences of the stator core 160A and the magnetic body 400 are fixed to the inside of the container 32, so that the axial gap type motor 10A is fixed. A lower end of the shaft 12 is coupled to the compressor mechanism section 36.

The compressor mechanism section 36 includes a main body 70 having a cylindrical shape, an upper end plate 71T, and a lower end plate 71B. The upper end plate 71T and the lower end plate 71B are attached at the upper and lower sides of an opening of the main body 70, respectively. The shaft 12 extends through the upper end plate 71T and the lower end plate 71B, and is inserted into the main body 70.

The shaft 12 is rotatably supported by a bearing 72T provided on the upper end plate 71T of the compressor mechanism section 36 and a bearing 72B provided on the lower end plate 71B of the compressor mechanism section 36. A crank pin 73 is provided to the shaft 12 within the main body 70. A piston 74 is fitted to the crank pin 73, and is driven. In a compression chamber 75 formed between the piston 74 and a corresponding cylinder, the cooling medium is compressed. The piston is a rotor in an eccentric state, or performs an orbital motion, to change the volume of the compression chamber 75.

When the compressor mechanism section 36 is driven by the rotation of the axial gap type motor 10A, the cooling medium is supplied through the inlet pipe 41 to the compressor mechanism section 36, and the cooling medium is compressed in the compressor mechanism section 36 (particularly the compression chamber 75). The high-pressure cooling medium compressed in the compressor mechanism section 36 is discharged into the container 32 through a discharge port 43 of the compressor mechanism section 36. Furthermore, the high-pressure cooling medium passes through a groove (not shown) provided around the shaft 12, a hole (not shown) extending through the rotor 14A and the stator 16A in the rotation axis Q, a space between an inner surface of the container 32 and the outer circumferences of the stator 16A and the rotor 14A, and the like, and is transported to a space at the upper side of the axial gap type motor 10A. Then, the high-pressure cooling medium is discharged to the outside of the container 32 through the discharge pipe 42.

<Method of Operating Air Conditioner>

FIG. 5 is a diagram showing a connection between a power source PS and the motor 10A. A current is supplied from the power source PS via an inverter 50 to the motor 10A, and particularly the armature winding 16CA, mounted in the compressor 30 of the air conditioner 100. To be specific, firstly, a converter 52 converts an alternate current supplied from the power source PS into a direct current, and a PWM inverter 54 converts the direct current obtained from the converter 52 into an alternate current and supplies it to the armature winding 16CA. The converter 52 and the PWM inverter 54 are connected to each other by a DC link part 56. The power source PS may be either three-phase one or a single-phase one.

In the above-described motor 10A, the rare-earth magnet 14MA is thermally demagnetized in a load region (hereinafter referred to as a "heating high-load operation") equal to or greater than the maximum number of rotations at the time of the heating operation, or a predetermined number of rotations, so that a voltage applied to the motor 10A is relatively raised. Specifically, when the rare-earth magnet 14MA is heated, a residual magnetic flux density of the rare-earth magnet 14MA is reduced, and an operating-point magnetic flux density is also reduced. This makes an induced voltage of the axial gap type motor 10A sufficiently smaller than a voltage of the DC link part 56, and therefore a higher-speed operation is allowed. In other words, the residual magnetic flux density of the rare-earth magnet 14MA is weakened by an induction heating, to thereby allow a high-speed operation.

As a method for heating a magnet, an induction heating (IH; Induction Heating) is known. In the induction heating, a rare-earth sintered magnet (particularly, a neodymium-based sintered magnet) has a high electrical conductivity, and easily causes an eddy current therein. On the other hand, the rotor core 140A and the stator core 160A are often formed of a lamination of steel plates or an iron-dust core for the purpose of reducing an iron loss, and an eddy current does not easily occur. Therefore, the rare-earth magnet 14MA generates heat more easily than the rotor core 140A and the stator core 160A do.

The rare-earth sintered magnet causes irreversible demagnetization at a high temperature. However, a motor is normally designed with an allowance for irreversible demagnetization at a time of locking due to a failure of start-up, an oil shortage, or the like. Accordingly, in a case of a stable operation, there is relatively an allowance for demagnetization. To the contrary, in a case where an instable angle advancing is performed for a field weakening control, a step-out easily occurs and therefore there is a sensitivity to irreversible demagnetization.

Thus, at the time of the heating high-load operation, the rare-earth magnet 14MA is heated by the induction heating. Additionally, the cooling medium having a lower temperature than that of the rare-earth magnet 14MA is flown near the rare-earth magnet 14MA, so that the temperature of the cooling medium is raised, which contributes to the heating operation. For example, to realize the same heating capability as conventional, the capability of the compressor 30 can be reduced to the extent corresponding to the heat. Therefore, a load of the axial gap type motor 10A at the time of the heating high-load operation is not so increased, relative to the low-load operation which is performed for a long time. Thus, a motor efficiency at the time of the low-load operation, and therefore a compression efficiency of the compressor 30, can be improved.

At the time of the cooling operation, the field is weakened by current-phase advance, and the operation is performed in a load region (hereinafter referred to as a "cooling high-load operation") equal to or greater than the maximum number of rotations of the motor 10A at the time of the cooling operation, or a predetermined number of operations. Alternatively, at the time of the cooling high-load operation, the voltage of the DC link part 56 may be boosted.

<Technique of Thermal Demagnetization>
<Current Waveform>

For thermal demagnetization of the rare-earth magnet 14MA, it is desirable that the current supplied to the armature winding 16CA is as follows.

The thermal demagnetization at the time of the heating high-load operation can be realized by, for example, superimposing a harmonic current on the armature winding 16CA. In a specific example, a current having a sufficiently higher frequency than a carrier frequency of the PWM inverter may be superimposed. Alternatively, in order that a duty of an output signal of the PWM inverter 54 at the time of the heating high-load operation be made smaller than a duty of an output signal of the PWM inverter 54 at the time of the cooling high-load operation, the voltage of the DC link part 56 at the time of the heating high-load operation may be made higher than the voltage of the DC link part 56 at the time of the cooling high-load operation. That is, in order to reduce the duty at the time of the heating operation, the voltage of the DC link part 56 is increased, so that a harmonic component of the current flowing in the armature winding 16CA is increased, which contributes to the induction heating.

FIG. 6 is a diagram showing a relationship between the duty ((a) of the same figure) of the output signal of the PWM inverter 54 and the current ((b) of the same figure) flowing in the armature winding 16CA. Comparing a case where the duty of the output signal of the PWM inverter 54 is high (illustrated with dot-dash-lines in the drawing) and a case where it is low (illustrated with solid lines in the drawing), a peak appearing in a current waveform of the current flowing in the armature winding 16CA is steeper in the latter case. This means that the harmonic component of this current is increased. However, if the voltage of the DC link part 56 is remain low, this peak is also small. Therefore, it is desirable to raise the voltage of the DC link part 56 in a case where the duty of the output signal of the PWM inverter 54 at the time of the heating high-load operation is made low.

Although in FIG. 3, the rotor core 140A is at the stator 16A side of the rare-earth magnet 14MA, the rare-earth magnet 14MA may be exposed at the stator 16A side. In such a case, the rare-earth magnet 14MA can be induction-heated more efficiently.

Figure 7:
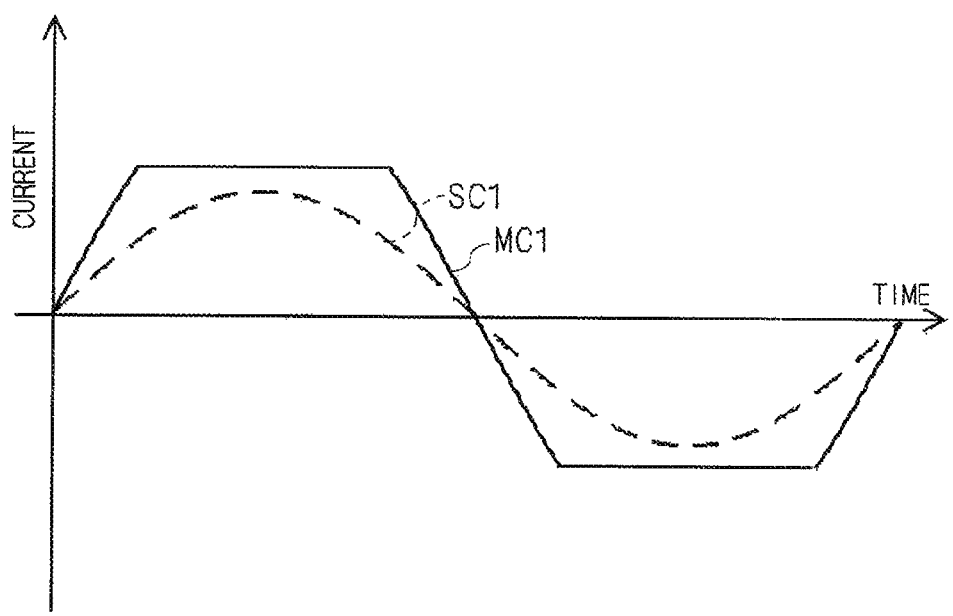
FIG. 7 is a current waveform diagram showing a sinusoidal wave current and an overmodulated current.

FIG. 7 is a current waveform diagram showing a sinusoidal wave current SC1 and an overmodulated current MC1. At the time of the heating high-load operation, the overmodulated current MC1 which is overmodulated in and outputted by the PWM inverter 54 is supplied to the armature winding 16CA. At a time (hereinafter referred to as a "time of a normal operation") other than the heating high-load operation, the sinusoidal wave current SC1 is supplied to the armature winding 16CA. Since the overmodulated current MC1 approaches to a square wave and largely distorted, it can be recognized that the harmonic current is superimposed on the current flowing in the armature winding 16CA. Here, as the power source PS of the axial gap type motor 10A, for example, a three-phase alternate current power source of a U-phase, a V-phase, and a W-phase is adopted. Therefore, a current waveform diagram differs among the phases. However, only one phase is shown in FIG. 7.

Figure 8:
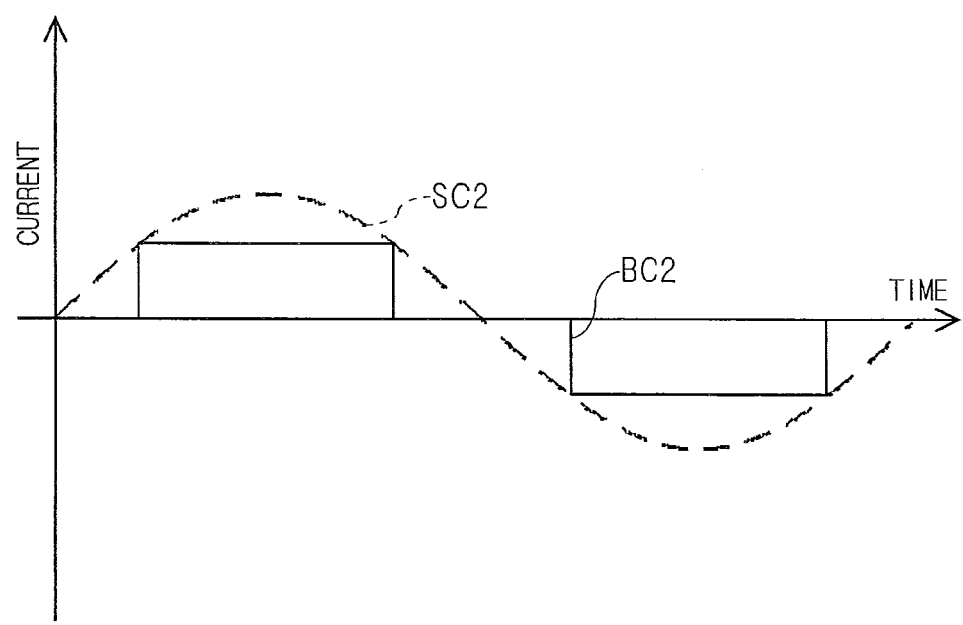
FIG. 8 is a current waveform diagram showing a sinusoidal wave current and a square wave current.

FIG. 8 is a current waveform diagram showing a sinusoidal wave current SC2 and a square wave current BC2. Similarly to FIG. 7, FIG. 8 shows a current waveform diagram for only one phase. At the time of the heating high-load operation, the square wave current BC2 is supplied to the armature winding 16CA. In the normal operation, the sinusoidal wave current SC2 is supplied to the armature winding 16CA. For the induction heating, the square wave current BC2 is more desirable because the harmonic component is larger than in the over-modulated current MC1. When the sinusoidal wave current is supplied in the normal operation as shown in FIG. 7 or FIG. 8, a current control by which a current waveform coincides with a magnetic flux waveform is desirable.

Figure 9:
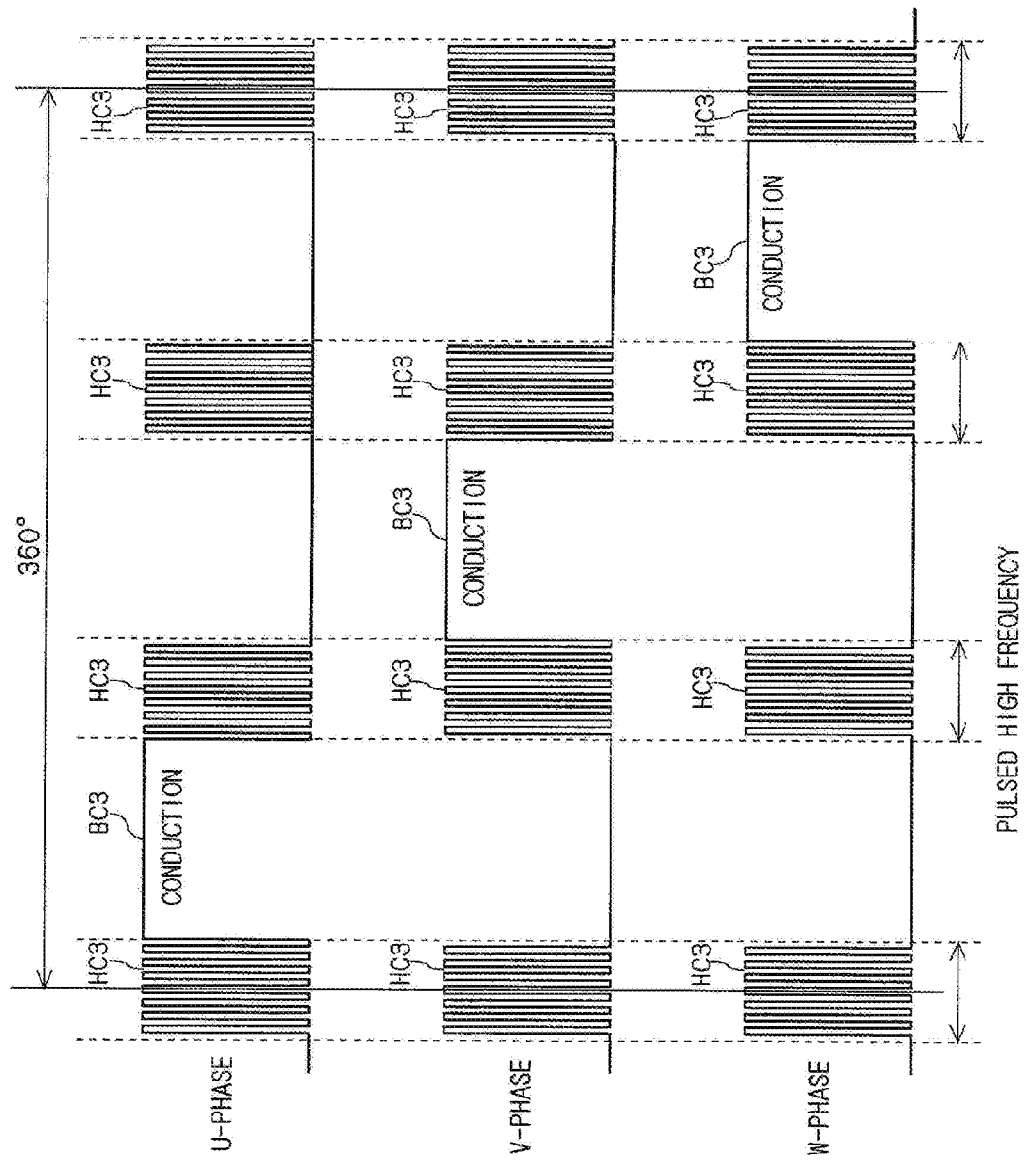
FIG. 9 is a current waveform diagram showing a square wave current and a harmonic current.

FIG. 9 is a current waveform diagram showing a square wave current BC3 and a harmonic current HC3. At the time of the heating high-load operation, by flowing the harmonic current HC3 in a non-conducting time zone of the square wave current BC3, the rare-earth magnet 14MA can be further induction-heated. When the harmonic current HC3 is flown, the induction heating can be promoted by increasing the carrier frequency of the inverter 50. Although there is a square wave in this waveform, it is desirable that the harmonic current HC3 is sufficiently larger than the carrier frequency in this embodiment, and an amplitude or a duty cycle may be low.

Alternatively, at the time of the heating high-load operation, the carrier frequency of the inverter 50 may be made higher than in the normal operation. At the time of the heating high-load operation, normally, the number of rotations of the axial gap type motor 10A is increased. Therefore, there is an advantage that, by making the carrier frequency high, the sinusoidal wave current waveform can be smooth.

A region induction-heated by the current flowing in the armature winding 16CA is a range of the skin depth δ from the armature winding 16CA, and is normally represented by the next expression.

[Math. 2]

$$\delta = \sqrt{\frac{2}{\omega\mu\sigma}} \ [m] \quad (2)$$
$${}^*\mu = 4\pi \times 10^{-7},$$
$$\sigma = 1.0 \times 10^7 \ [S/m]$$

where:
ω:=an angular frequency of the current flowing in the armature winding 16CA;
μ:=an absolute magnetic permeability of the conductive wire forming the armature winding 16CA; and
σ:=an electrical conductivity of the conductive wire forming the armature winding 16CA.

If it is assumed that the frequency ω/2π is 5 kHz, the skin depth δ is approximately a few millimeters. That is, by setting the carrier frequency at a frequency of this level, the effect of the induction heating can be obtained even if a distance from the armature winding 16CA to the rare-earth magnet 14MA is a few millimeters.

<Observation and Correction of φa>

When a field magnetic flux φa is reduced by the induction heating, the magnetic flux density within the rotor core 140A is reduced. Excessive induction heating results in irreversible demagnetization which will be described later. Generally, a q-axis inductance is reduced as the field magnetic flux φa is larger. This is because the increase of the field magnetic flux φa causes magnetic saturation of the rotor core 140A. Accordingly, as the thermal demagnetization advances, the q-axis inductance increases. Thus, when the induction heating is performed, it is desirable to measure reduction of the field magnetic flux φa and correct a q-axis inductance Lq. Thereby, a sensorless operation not using a position sensor for detecting the position of the rotor 14A can be stable performed.

Generally, it is known that an induced voltage V0 of a motor satisfies the following expression with respect to the reverse induced voltage φ of the motor, the rotation angle speed ω, the d-axis current id, the q-axis current iq, the d-axis inductance Ld, and the q-axis inductance Lq, which are mentioned above.

[Math. 3]

$$V0 = \omega \cdot \phi 0 = \sqrt{(Ld \cdot id + \phi a)^2 + (Lq \cdot iq)^2} \quad (3)$$

Now, if both of the d-axis current id and the q-axis current iq are zero, an influence of the d-axis inductance Ld and the q-axis inductance Lq can be removed based on the expression (3). Since the induced voltage V0 and the rotation angle speed ω can be easily measured, the field magnetic flux φa can be obtained by calculation therefrom. In other words, to observe the field magnetic flux φa, it is desirable that the observation is made in the non-conducting time zone in which the observation does not flow.

In a case where the sinusoidal wave currents SC1, SC2 are supplied as shown in FIG. 7 and FIG. 8, the conduction may be forcibly stopped to provide a non-conducting time zone when the induced voltage V0 has the maximum value, and the field magnetic flux φa may be obtained in this non-conducting time zone. By providing the non-conducting time zone when the induced voltage V0 has the maximum value, an error of the obtained field magnetic flux φa can be made small.

In a case where the non-conducting time zone is provided, the non-conducting time zone is provided when the induced voltage V0 of any one of the phases U, V, W connected to the axial gap type motor 10A has the maximum value. Alternatively, if the induced voltage V0 of each of the phases is measured, it has the maximum value at intervals of 120°, and therefore the number of opportunities to obtain the field magnetic flux φa is increased, and a measurement accuracy thereof is improved.

<Prevention of Irreversible Demagnetization>

In the rare-earth magnet 14MA, if excessive induction heating is performed, a phenomenon called irreversible demagnetization occurs in which the amount of magnetic flux is not recovered even if a reverse magnetic field is removed. This phenomenon is remarkable particularly in a neodymium-based rare-earth magnet. If irreversible demagnetization occurs, a normal operation and a high-load operation become instable irrespective of whether it is heating or cooling, and additionally the efficiency is lowered. Thus, it is desirable to take measures for preventing the irreversible demagnetization. For example, if the temperature of the rare-earth magnet 14MA is higher than the temperature of the cooling medium emitted from the compressor mechanism section 36, the cooling medium discharged from the discharge pipe 42 can recover the heat of the rare-earth magnet 14MA to raise the temperature of the cooling medium. In other words, by the cooling medium, the heat of the rare-earth magnet 14MA is recovered so that excessive heating can be avoided or suppressed.

As the measures for preventing the irreversible demagnetization, a method is conceivable in which the temperature of the rare-earth magnet 14MA is estimated or measured, and when it exceeds a predetermined threshold value of the temperature, the induction heating is stopped. Alternatively, a method is conceivable in which a field magnetic flux at a time when irreversible demagnetization occurs is experimentally obtained and stored as a threshold value, and the induction heating is stopped based on comparison between the field magnetic flux pa obtained during the operation and this threshold value.

<Avoidance of Irreversible Demagnetization by Temperature Estimation>

In a case where a determination is made based on the temperature of the rare-earth magnet 14MA, for example, a temperature sensor 62 is provided near the discharge pipe 42 of the compressor 30A, to detect the temperature of the cooling medium. Since the cooling medium exchanges heat with the rare-earth magnet 14MA, the temperature of the rare-earth magnet 14MA can be estimated by detecting the temperature of the cooling medium.

<Avoidance of Irreversible Demagnetization based on Torque Command Value>

In a case where the field magnetic flux pa obtained during the operation and the predetermined threshold value are compared with each other, for example, an increase and a decrease of the temperature of the rare-earth magnet 14MA is detected based on an increase of the current relative to the torque command value within the inverter 50.

Figure 10:
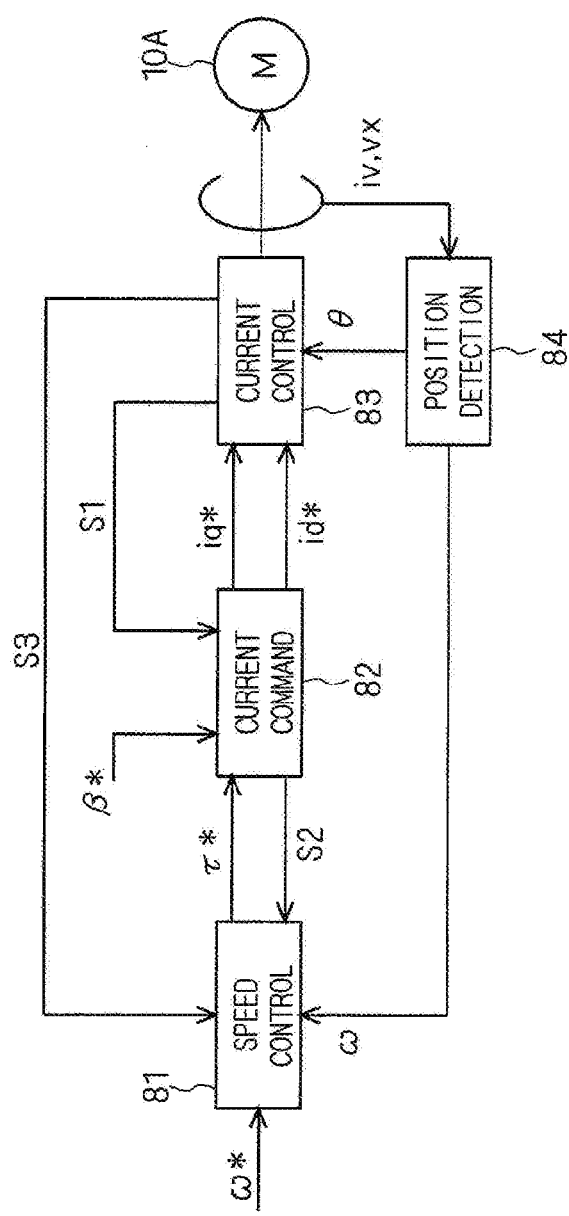
FIG. 10 is a conceptual diagram for explanation of a technique of avoiding irreversible demagnetization based on a torque command value.

FIG. 10 is a block diagram illustrating a motor control technique. A motor control device 80 of the axial gap type motor 10A includes a speed control section 81, a current command section 82, a current control section 83, and a position detection section 84.

The speed control section 81 and the current command section 82 cooperate with each other to generate a d-axis current command value id* and a q-axis current command value iq* based on the rotation angle speed ω of the rotor 14A of the axial gap type motor 10A and a command value ω* thereof.

Specifically, the speed control section 81 generates a torque command value τ* based on the rotation angle speed ω and the command value ω* thereof. At this time, even when the command value ω* of the rotation angle speed ω increases, the torque command value τ* is not increased if any one of suspend commands S2, S3 for reducing the rotation angle speed ω is given from the current command section 82 and the current control section 83, respectively.

The current command section 82 generates the d-axis current command value id* and the q-axis current command value iq* based on the torque command value τ* and a current phase command value β*. Here, a relationship represented by the following expression is maintained between the current phase command value β*, and the d-axis current command value id* and the q-axis current command value iq*.

[Math. 4]

$$\beta^* = \tan^{-1}\left(-\frac{id^*}{iq^*}\right) \quad (4)$$

At this time, when the absolute value of a voltage given to the axial gap type motor 10A exceeds a predetermined value Vt, an overvoltage detection signal S1 indicating detection of an overvoltage is given from the current control section 83 to the current command section 82, to increase the current phase command value β* and perform the field weakening control.

The current control section 83 supplies a current ix that controls the rotation of the axial gap type motor 10A based on the d-axis current command value id* and the q-axis current command value iq* obtained from the current command section 82, and a position angle θ of the rotor 14A.

The position detection section 84 detects the position angle θ by estimation based on the current ix and a voltage vx supplied to the axial gap type motor 10A, and also obtains the rotation angle speed ω.

If the axial gap type motor 10A is a motor with respect to each of the U, V, W phases, the current ix and the voltage vx corresponds to a generic term of an U-phase current iu, a V-phase current iv, and a W-phase current iw, and a generic term of an U-phase voltage vu, a V-phase voltage vv, and a W-phase voltage vw, respectively.

Generally, a torque of a motor is proportional to the product of a field magnetic flux and a current flowing in the motor. Therefore, in a case where the current ix increases even though the torque command value τ* is kept constant, it can be determined that the field magnetic flux φa is reduced.

As the measures for preventing the irreversible demagnetization, for example, the following technique is conceivable in addition to the above-described ones.

Since the rotor core 140A which is in close contact with the rare-earth magnet 14MA is opposed to the armature winding 16CA with a slight space interposed therebetween, the temperature of the rare-earth magnet 14MA can be estimated by detecting the temperature of the armature winding 16CA. Accordingly, for example, the temperature of the armature winding 16CA is detected before the induction heating is started, and if the temperature exceeds a predetermined temperature threshold value, the induction heating is not performed to thereby prevent the irreversible demagnetization.

Figure 11:
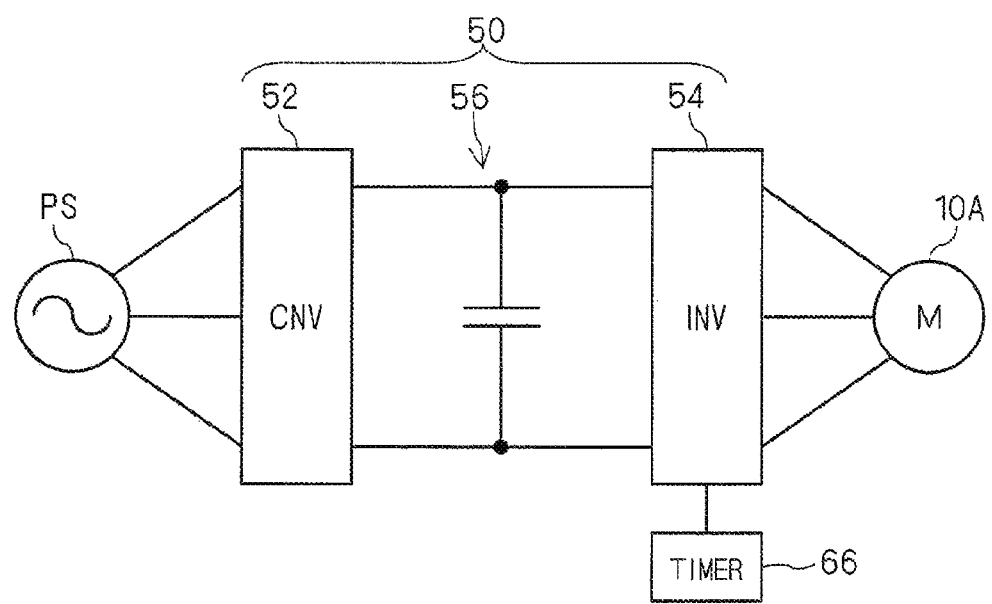
FIG. 11 is a diagram showing a connection between a power source and a motor.

FIG. 11 is a diagram showing a connection between the power source PS and the axial gap type motor 10A. In order to prevent the irreversible demagnetization, a timer 66 which measures a time period elapsed since the induction heating is started may be further provided to the axial gap type motor 10A, and the induction heating may be stopped after a predetermined time period elapses since the induction heating is started.

In a case where an instantaneous stop occurs, it is desirable that no induction heating is performed immediately after recovery, in consideration of a case where the induction heating has been performed until immediately before the instantaneous stop occurs. In such a case, if the induction heating is continuously perform, there is a possibility of excessive heating.

In a case where the axial gap type motor 10A performs the sensorless operation, it is desirable, for a stable operation, that the field magnetic flux φa of the rare-earth magnet 14MA at the time of start-up is equal to or larger than a constant amount. Therefore, the number of rotations of the rotor 14A is measured, the induction heating is not performed until a variation of the measured number of rotations per unit time becomes equal to or smaller than a predetermined threshold value. In other words, a start of the induction heating is suspended until the operation of the axial gap type motor 10A is stabilized.

By taking the above-described measures, excessive heating of the rare-earth magnet 14MA can be avoided or suppressed, and thus the irreversible demagnetization can be avoided or suppressed.

<Prevention of Overheating of Stator>

In a case where a harmonic current is superimposed on the current flowing in the armature winding 16CA, not only the rare-earth magnet 14MA but also other elements are induction-heated. In a case where the rotor core 140A is heated, it supports heating of the rare-earth magnet 14MA and thus there is no particular trouble. However, there is a problem that heating of the stator 16A raises the temperature of the armature winding 16CA, too, so that an electrical resistance value increases, which causes an increase of a copper loss. It is therefore desirable to suppress heating of the stator 16A while heating the rare-earth magnet 14MA.

Thus, hereinafter, techniques of suppressing heating of the stator 16A will be described. The following techniques can be adopted in appropriate combination.

As a first technique of suppressing heating of the stator 16A, the iron loss of the stator core 160A is made smaller, in comparison between the stator core 160A and the rotor core 140A. For example, a silicon steel plate, an iron-dust core, or the like, may adopted as the material of the rotor core 140A, while a material having a small iron loss, such as amorphous, ferritic core, or permalloy, may be adopted as the material of the stator 16A.

As a second technique of suppressing heating of the stator 16A, a harmonic absorption material 20A serving as an insulator may be arranged between the armature winding 16CA and the stator core 160A.

Figure 12:
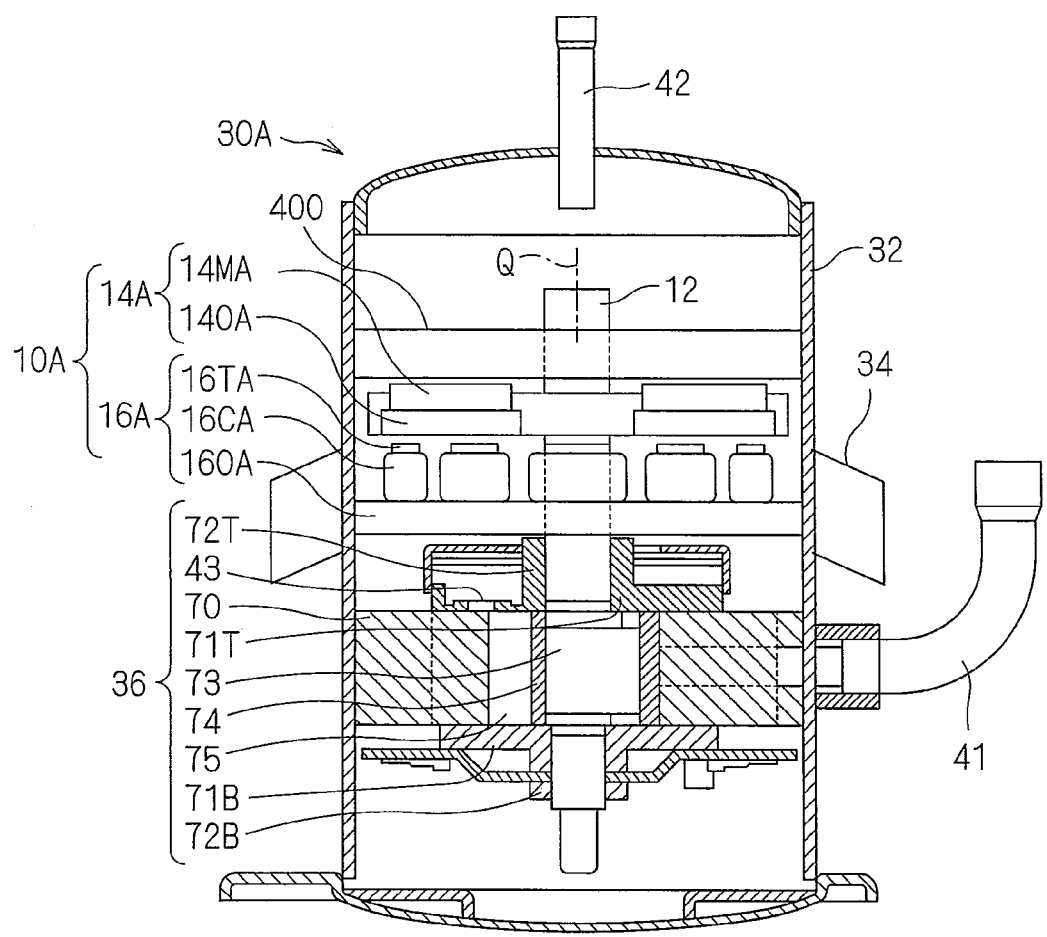
FIG. 12 is a cross-sectional view of a compressor.

FIG. 12 is a cross-sectional view of the compressor 30A. A third technique of suppressing heating of the stator 16A can be adopted when a motor is a radial gap type motor of inner-rotor type or the axial gap type motor 10A. A description will be given taking the axial gap type motor 10A as an example. The stator 16A thereof is held while being fitted at the inner circumference side of the container 32 of the compressor 30A. A heat dissipation mechanism such as a heat dissipation fin 34 is further provided at a position of the exterior of the container 32 corresponding to where the stator 16A is held. The heat dissipation fin 34 efficiently cools the stator 16A. The heat dissipation fin 34 may be extended to a position corresponding to the position of the armature winding 16CA, or may be separately provided at a position corresponding to the position of the armature winding 16CA, to efficiently cool the armature winding 16CA. An embodiment in which the compressor 30 (see FIG. 1, FIG. 2) has a radial gap type motor mounted therein will be described in detail later.

Figure 13:
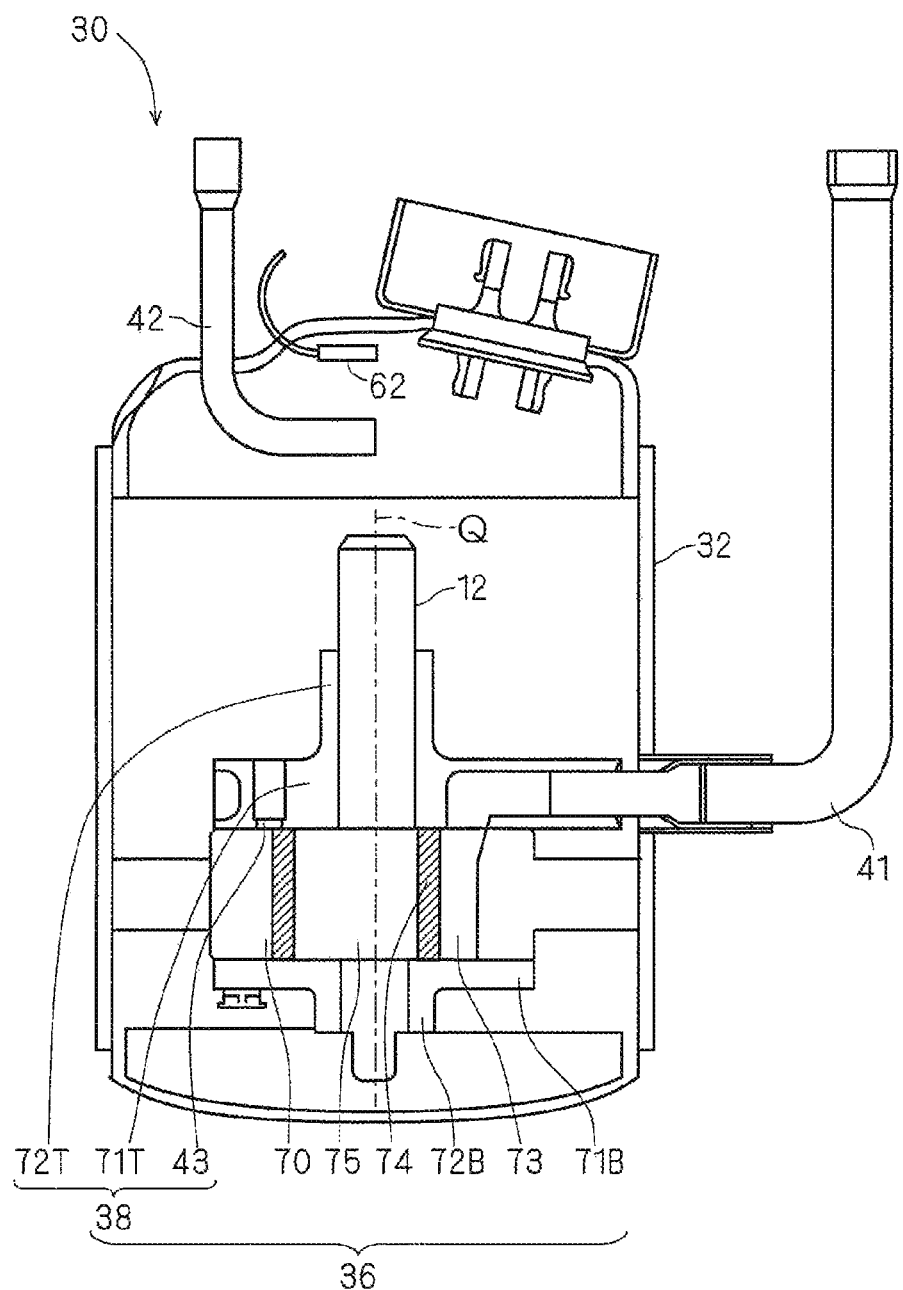
FIG. 13 is a cross-sectional view of the compressor from which the axial gap type motor is dismounted.

FIG. 13 is a cross-sectional view of the compressor 30 from which the axial gap type motor is dismounted. As a fourth technique of suppressing heating of the stator 16A, a motor mounted in the compressor 30 is the axial gap type motor 10A or a radial gap type motor of outer-rotor type, and the stator 16A thereof is fixed to the compressor mechanism section 36 side. Thereby, heat is dissipated from the stator 16A to the container 32 through the compressor mechanism section 36. In this case, a low-pressure cooling-medium jacket 38 may be further provided in an upper portion of the compressor mechanism section 36 within the container 32 which presents a high-pressure dome, so that the cooling medium sucked at a low temperature is brought into close contact with the stator 16A, to thereby cause the cooling medium before reaching the vicinity of the rare-earth magnet 14MA to exchange heat with the stator 16A, to actively cool the stator. By cooling of the stator 16A, a temperature rise in the armature winding 16CA is suppressed, and the copper loss is suppressed. Here, the low-pressure cooling-medium jacket 38 is for temporarily reserving sucked gas of the compressor and supplying the cooling medium to the compressor mechanism section 36. In the high-pressure dome, the temperature is lower in a part corresponding to the low-pressure cooling-medium jacket 38, as compared with the surroundings thereof.

In the above, the techniques of demagnetization by induction-heating the rare-earth magnet 14MA have been described taking as an example the compressor 30A having the axial gap type motor 10A mounted therein. To realize the techniques, a configuration of the device differs depending on a kind of the motor mounted in the compressor 30. The case where the motor mounted in the compressor 30 is a radial gap type will be described in detail later.

Figure 14:
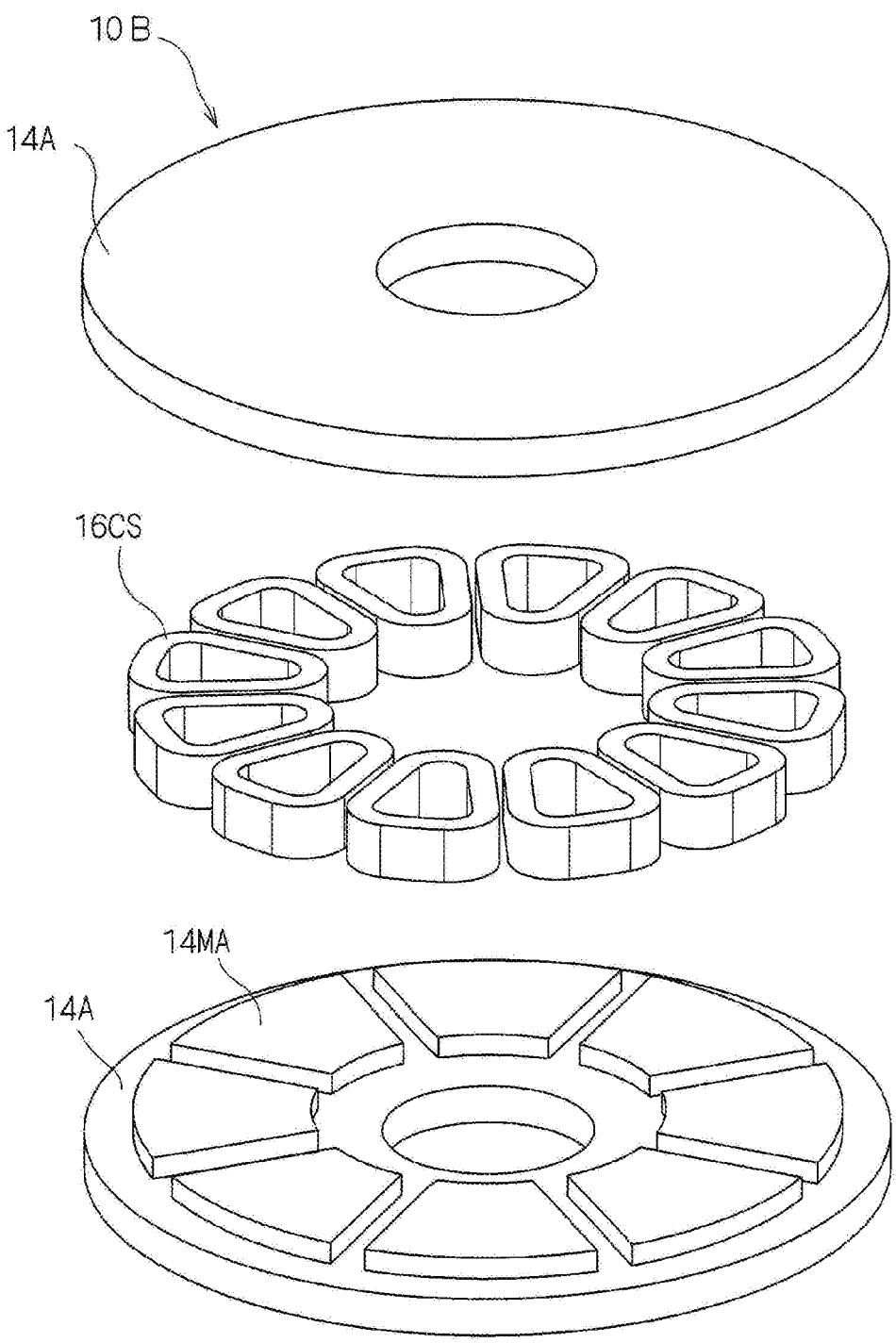
FIG. 14 is an exploded perspective view of an axial gap type motor which adopts a coreless stator.

FIG. 14 is an exploded perspective view of an axial gap type motor 10B which adopts a coreless stator, as exploded along the direction of the rotation axis Q. As a fifth technique of suppressing heating of the stator 16A, an air-cored coil 16CS not having the teeth 16TA and a yoke may be adopted instead of the above-described stator 16A, to form a so-called gap-winding motor.

In the axial gap type motor 10B, two rotors 14A are opposed to each other with the air-cored coil 16CS interposed therebetween along the direction of the rotation axis Q. The air-cored coil 16CS can be easily formed by adoption of a rectangular conductive wire having self-adhesiveness, or alternatively can be easily obtained by molding with a heat-resistant resin and a fiber filler after forming the air-cored coil 16CS a the conductive wire.

Since the rare-earth magnet 14MA is heated using the armature winding 16CS, it is desirable that the rare-earth magnet 14MA and the armature winding 16CS are as close to each other as possible. From this viewpoint, it is preferred to adopt an axial gap type motor in which normally the rare-earth magnet 14MA is arranged on a surface of the rotor core 140A.

Second Embodiment

Application Characteristic of Motor Mode

In this embodiment, a mode in which the compressor 30 has a radial gap type motor 10R mounted therein will be described.

FIG. 15 is an exploded perspective view of a part of the radial gap type motor 10R, as exploded in a radial direction around the rotation axis Q.

<Configuration of Radial Gap Type Motor 10R>

The radial gap type motor 10R includes, for example, a rotor 14R serving as a field element, and a stator 16R serving as an armature. In an actual radial gap type motor, the rotor 14R is opposed to the stator 16R with a slight space interposed therebetween in the radial direction around the rotation axis Q.

The stator 16R has a yoke 16Y, a teeth 16TR held by the yoke 16Y, and an armature winding 16CR wound on the teeth 16TR as a core. Although two of the teeth 16TR are shown herein, the teeth 16TR are annularly arranged around the rotation axis Q to surround the rotor 14R in the actual motor 10R. The armature winding 16CR is wound in a distributed winding form or a wave winding form so as to extend over the plurality of teeth 16TR.

The rotor 14R has a rare-earth magnet 14MR, and a substantially column-like rotor core 140R which holds the rare-earth magnet 14MR. The shaft 12 is inserted through the rotor core 140R along the direction of the rotation axis Q.

The rare-earth magnet 14MR is formed as a columnar member having an arc shape in a plan view in the rotation axis Q direction, and is arranged on a side surface of the rotor core 140R. Specifically, the rare-earth magnet 14MR is formed such that the inner diameter thereof centered at the rotation axis Q is equal to the radius of a circle defined by the rotor core 140R, and the outer diameter thereof has a predetermined length. A surface defining the inner diameter is arranged on the side surface of the rotor core 140R. That is, an SPM (Surface Permanent Magnet; surface magnet type) motor is shown as an example of the motor 10R.

Figure 16:
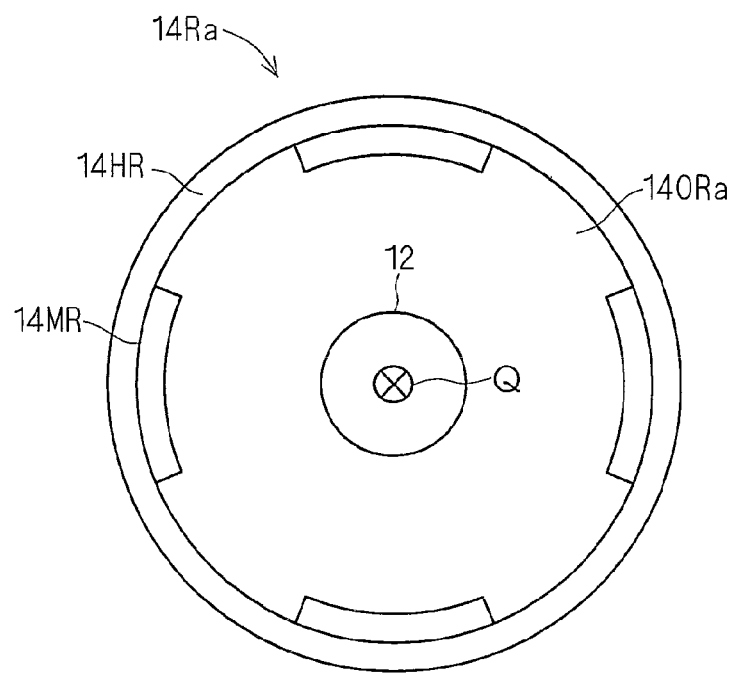
FIG. 16 is a plan view of a rotor of an SPM motor.

FIG. 16 is a plan view of a rotor 14Ra of the SPM motor. The rotor 14Ra has a rotor core 140Ra, a rare-earth magnet 14MR, and a holding member 14HR. The rotor 14Ra as shown in FIG. 16 may be adopted instead of the rotor 14R described above.

The holding member 14HR is formed into a substantially cylindrical shape centered at the rotation axis Q, and holds the rotor core 140Ra and the rare-earth magnet 14MR at the inside thereof. Specifically, the rare-earth magnet 14MR is equally arranged along an inside surface of the holding member 14HR, and the rotor core 140Ra is formed so as to occupy a region surrounded by the holding member 14HR and the rare-earth magnet 14MR. The holding member 14HR functions as a air gap in a magnetical sense, and therefore is desirably thin.

In other words, in the rotor core 140Ra a groove along the direction of the rotation axis Q is provided at a side of the substantially columnar member, and the rare-earth magnet 14MR is arranged in the groove so that a substantially circular shape in a plan view is given. The holding member 14HR having a substantially cylindrical shape is fitted to the outside of the rotor core 140Ra and the rare-earth magnet 14MR, to thereby firmly hold the rare-earth magnet 14MR against a centrifugal force caused by the rotation of the rotor 14Ra.

In this case, the holding member 14HR is formed by a non-magnetic body in order to prevent the rare-earth magnet 14MR from being magnetically short-circuited. Additionally, a material causing a small eddy current loss is adopted for the holding member 14HR, in order not to hinder the induction heating of the rare-earth magnet 14MR. Alternatively, in view of indirect heating of the rare-earth magnet 14MR, a material having a high thermal conductivity is adopted for the holding member 14HR. For example, SUS is adoptable for the rare-earth magnet 14MR.

Figure 17:
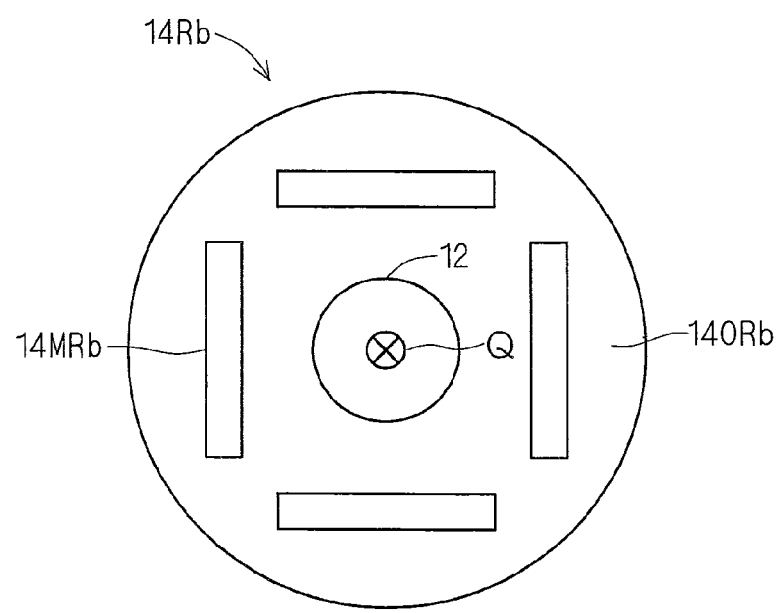
FIG. 17 is a plan view of a rotor of an IPM motor.

FIG. 17 is a plan view of a rotor 14Rb of an IPM (Interior Permanent Magnet) motor. The rotor 14Rb as shown in FIG. 17 may be adopted instead of the rotor 14R, 14Ra described above. The rotor 14Rb has a rotor core 140Rb and a rare-earth magnet 14MRb, and the rotor core 140Rb defines a hole extending in the direction of the rotation axis Q. The rare-earth magnet 14MRb is buried in the hole. Here, a magnetic pole surface of the rare-earth magnet 14MRb extends in a plane whose normal line is in the radial direction.

Figure 18:
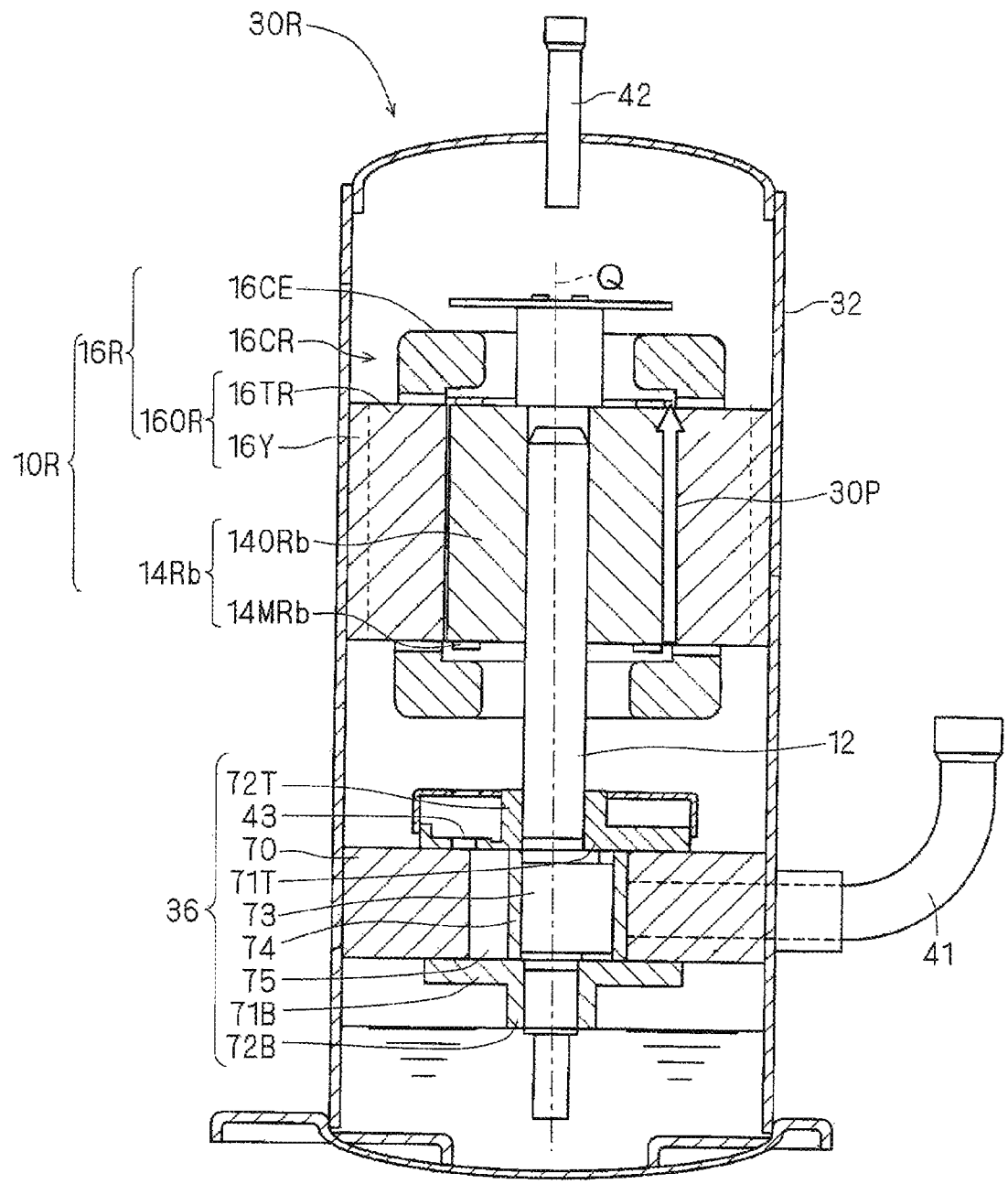
FIG. 18 is a cross-sectional view of a compressor having the radial gap type motor mounted therein.

FIG. 18 is a cross-sectional view of a compressor 30R having the radial gap type motor 10R mounted therein, showing an embodiment in which the rotor 14Rb is adopted. Elements having the same functions as those in the first embodiment described above are denoted by the same corresponding numerals, and descriptions thereof are omitted.

The compressor 30R has, within the container 32, the radial gap type motor 10R and the compressor mechanism section 36.

In a case where the armature winding 16CR is wound in the distributed winding form or the wave winding form, the armature winding 16CR is shaped as a coil and then inserted through the teeth 16TR. Therefore, a coil end 16CE, which is an end portion of the armature winding 16CR in the rotation axis Q and is a portion protruding from an end surface of the teeth 16TR, is more flexible than in a case of a concentrated winding form.

In the radial gap type motor 10R, among surfaces of the rare-earth magnet 14MR, the outside surface in the radial direction around the rotation axis Q is sometimes not exposed because it is covered with the holding member 14HR as in the rotor 14Ra or the rare-earth magnet 14MRb is buried inside the rotor core as in the rotor 14Rb. However, even when such an embodiment is adopted, the end portion in the direction of the rotation axis Q among the surfaces of the rare-earth magnet 14MR is exposed on the surface of the rotor core.

Accordingly, by utilizing the flexibility exerted by the coil end 16CE and shaping the coil end 16CE so as to protrude toward the rare-earth magnet 14MR, the rare-earth magnet 14MR, 14MRb can be induction-heated without interposition of the holding member 14HR and the rotor core 140R. For example, a rectangular conductive wire having self-adhesiveness is adopted for the armature winding 16CR, and adhesion is made after the coil end 16CE is shaped in the above-described manner.

In order to suppress heating of the stator, it is preferable that, for example, the thickness of a single electromagnetic steel plate constituting the stator core 160R is smaller than the thickness of a single electromagnetic steel plate constituting the rotor core 140R, in order that an iron loss of the stator core 160R is smaller when the thickness of the single electromagnetic steel plate constituting the stator core 160R and the thickness of the single electromagnetic steel plate constituting the rotor core 140R.

In the radial gap type motor 10R, it is desirable that a cooling medium passage 30P extending substantially in parallel with a direction in which a flow line of the cooling medium extends is ensured near the rare-earth magnet 14MR, 14MRb. That is, it is desirable that the cooling medium passage 30P is substantially in parallel with the flow line of the cooling medium.

Figure 19:
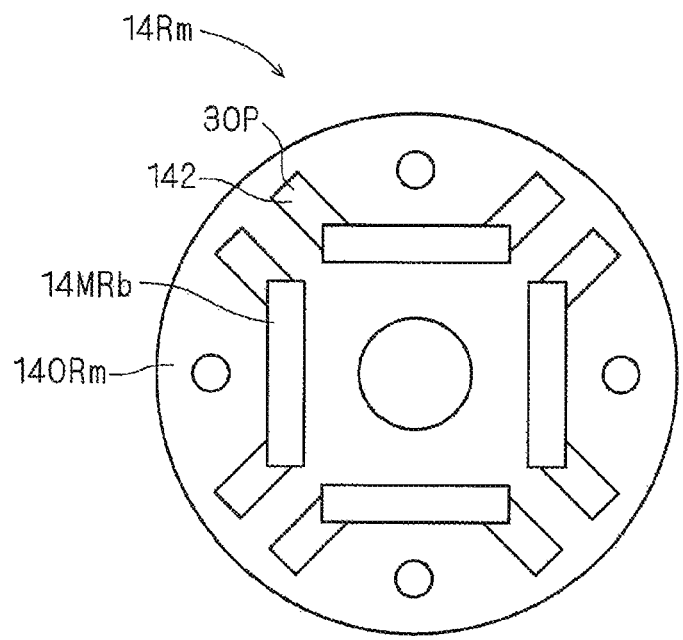
FIG. 19 is a plan view of an IPM rotor.

FIG. 19 is a plan view of an IPM rotor 14Rm. In the IPM rotor 14Rm, the rare-earth magnet 14MRb is buried in the rotor core 140Rm, and spaces 142 are provided at both lengthwise ends of the rare-earth magnet 14MRb in a plan view in the direction of the rotation axis Q, so that a side surface of the rare-earth magnet 14MRb is partially exposed.

The spaces 142 also function as a magnetic barrier which prevents a magnetic flux of the rare-earth magnet 14MRb from flowing in short circuit within the rotor core 140Rm, that is function as a so-called flux barrier. By using the spaces 142 as the cooling medium passage 30P, heat of the rare-earth magnet 14MRb can be efficiently recovered.

Figure 20:
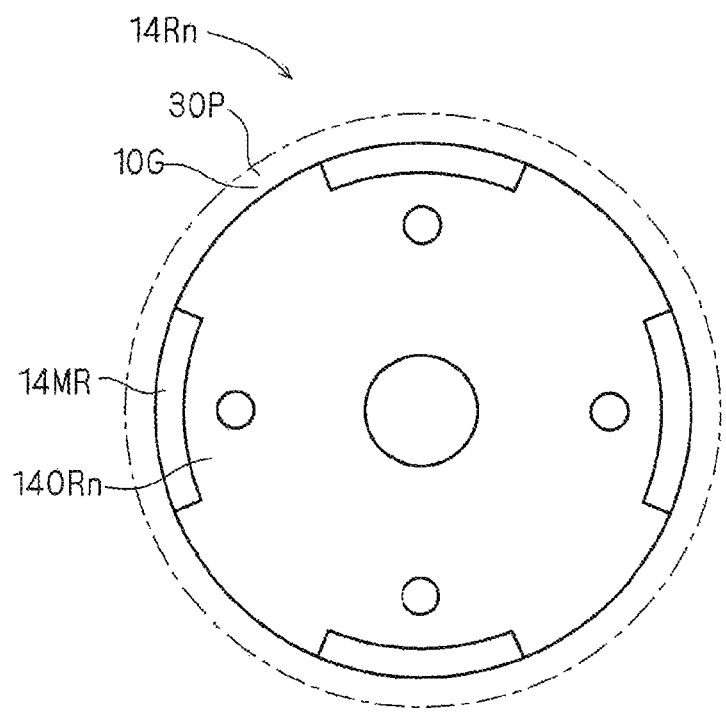
FIG. 20 is a plan view of an SPM rotor.

FIG. 20 is a plan view of an SPM rotor 14Rn, in which a stator provided around the SPM rotor 14Rn is omitted, and an air gap 10G formed between the stator and the SPM rotor 14Rn is imaginarily shown.

In the SPM rotor 14Rn, the rare-earth magnet 14MR is arranged on the side surface of the rotor core 140Rm having a substantially cylindrical shape, and the air gap 10G is provided therearound. By using the air gap 10G as the cooling medium passage 30P, heat of the rare-earth magnet 14MR can be efficiently recovered.

Figure 21:
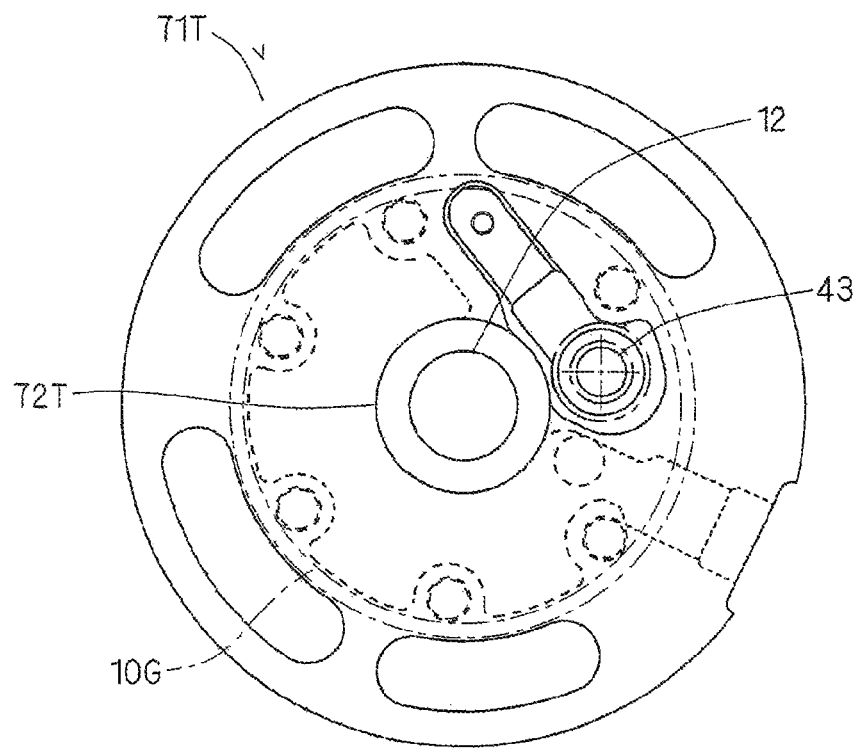
FIG. 21 is a diagram showing an upper end plate when viewed from a compressor mechanism section side toward a motor side.

FIG. 21 is a diagram showing the upper end plate 71T when viewed from the compressor mechanism section 36 side toward the motor side. In either of the embodiments of FIG. 19 and FIG. 20, it is desirable that a distance from the compressor mechanism section 36 to the discharge port 43 centered at the rotation axis Q is shorter than a distance to the cooling medium passage 30P in a concentric circle. This is because a centrifugal force acts on the cooling medium to make it difficult that the cooling medium flows inwardly in the radial direction from the outside in the radial direction.

Figure 22:
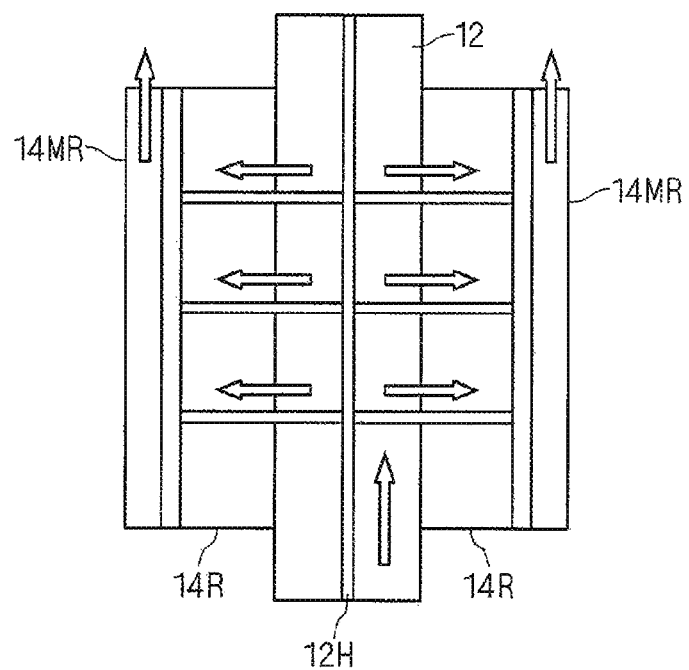
FIG. 22 is a cross-sectional view of a shaft and a rotor of the radial gap type motor.

FIG. 22 is a cross-sectional view of the shaft 12 and the rotor 14R of the radial gap type motor 10R, and FIG. 23 is a cross-sectional view of the shaft 12 and the rotor 14A of the axial gap type motor 10A. As shown in FIG. 22 and FIG. 23, a through hole 12H may be provided in the shaft 12, and the through hole 12H may communicate as the cooling medium passage 30P.

Specifically, in a case of the radial gap type motor 10R, the through hole 12H is provided in the shaft 12, and, at an appropriate position, branched from the direction of rotation axis Q into a direction extending outwardly in the radial direction, so that the through hole 12H extends in the rotor core 140R to lead to the rare-earth magnet 14MR.

In a case of the axial gap type motor 10A, the through hole 12H is provided in the shaft 12, and at a position corresponding to the rotor core 140A which holds the rare-earth magnet 14MA, branched from the direction of the rotation axis Q into a direction extending outwardly in the radial direction, so that the through hole 12H extends in the rotor core 140A to lead to the rare-earth magnet 14MA.

In either of the embodiments, the cooling medium guided to the rare-earth magnet 14MA, 14MR reaches the stator 16A, 16R side, and flows toward the discharge pipe 42.

In this manner, the cooling medium passage 30P is provided in the shaft 12 and guided outwardly in the radial direction by a centrifugal force, which also contributes to separation of a cooling medium oil.

FIG. 24 is a cross-sectional view of the motor 10R in a case where the coil ends 16CE protrude toward the rotation axis Q, and the compressor mechanism section 36 driven thereby. Each element is simplified. When the coil ends 16CE protrude toward the rotation axis Q, it is desirable that, among the coil ends 16CE formed at both ends of the teeth 16TR with respect to the rotation axis Q direction, at least the coil end 16CE at the compressor mechanism section 36 side protrudes toward the rotation axis Q. By selecting the coil end 16CE at the compressor mechanism section 36 side as the coil end 16CE protruding toward the rotation axis Q for the purpose of induction-heating the rare-earth magnet 14MR (or the rare-earth magnet 14MRb), it is easy that the rotor 14R, 14Ra, 14Rb is inserted after the stator 16R is arranged in the container 32 of the compressor 30R.

Furthermore, the length of the rare-earth magnet 14MR, 14MRb with respect to the direction of the rotation axis Q may be greater than the length of the rotor core 140R, 140Rb with respect to the same direction, so that the rare-earth magnet 14MR, 14MRb protrudes from the end surface of the rotor core 140R, 140Rb.

To manufacture the radial gap type motor 10R in which the coil end 16CE protrudes toward the rare-earth magnet 14MR, 14MRb, the manufacturing includes the following steps, for example.

Firstly, the armature winding 16CR is wound on the teeth 16TR (to be specific, the armature winding 16CR formed into a coil shape in advance is arranged around the teeth 16TR), and the yoke 16Y is attached to the teeth 16TR (see FIG. 15). Either one of the coil ends 16CE with respect to the direction of the rotation axis Q, for example, the coil end 16CE which will be opposed to the compressor mechanism section 36 (see FIG. 18) when arranged in the compressor 30R, is made protrude toward the rotation axis Q (see FIG. 24).

Then, from the other side with respect to the direction of the rotation axis Q, the rotor 14R is inserted into a space surrounded by the stator 16R, and the shaft 12 and the compressor mechanism section 36 are fitted to each other. Subsequently, the coil end 16CE at the other end with respect to the direction of the rotation axis Q is desirably made protrude toward the rotation axis Q. The coil end 16CE at this position also contributes to the induction heating.

Figure 25:
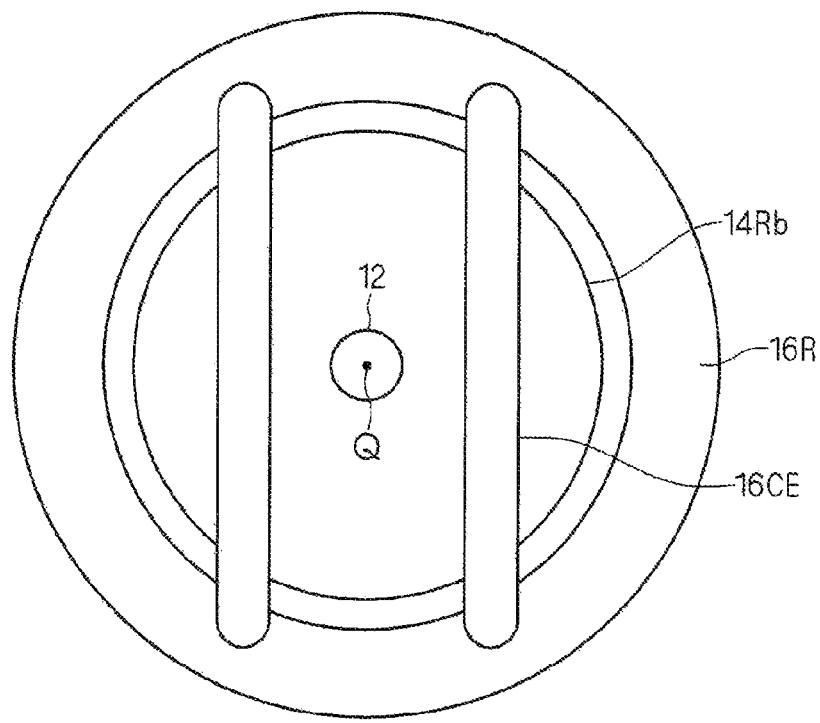
FIG. 25 is a plan view of the radial gap type motor in a case where the rotor is bipolar.

FIG. 25 is a plan view of the radial gap type motor 10R in a case where the stator 16 has a two-pole distributed winding, showing an overhead view in the direction of the rotation axis Q. Detailed portions such as a slot accommodating the armature winding 16CR are omitted. In the armature winding 16CR, only one phase is shown, and the other phases are omitted. As shown in FIG. 25, in the radial gap type motor 10R manufactured in the above-described manner, it is desirable that the coil end 16CE is in the shape of line segments in a plan view in the direction of the rotation axis Q. This enables the coil end 16CE to be easily close to the rare-earth magnet (not shown) included in the rotor 14R (14Rb), to provide a high induction-heating effect.

Figure 26:
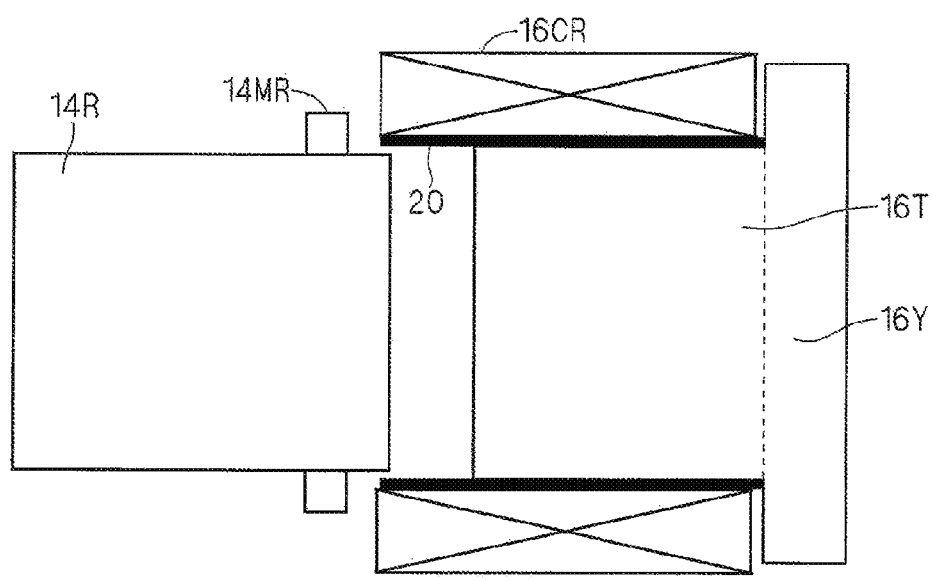
FIG. 26 is a cross-sectional view of the radial gap type motor.

FIG. 26 is a cross-sectional view of the radial gap type motor 10R. Since a high voltage is applied to the armature winding 16CR, the shorter an electrical distance between the armature winding 16CR and the rotor core 140R is, the more easily breakdown occurs. If the coil end 16CE is made protrude toward the rotation axis Q for the purpose of induction heating, the aforementioned distance is shortened. Therefore, an insulator 20 arranged between the armature winding 16CR and the stator core 160R is arranged, and it is desirable that the insulator 20 is made protrude toward the rotation axis Q along the coil end 16CE protruding toward the rotation axis Q. This can ensure a so-called creepage distance of insulation, to avoid or suppress the breakdown.

Figure 27:
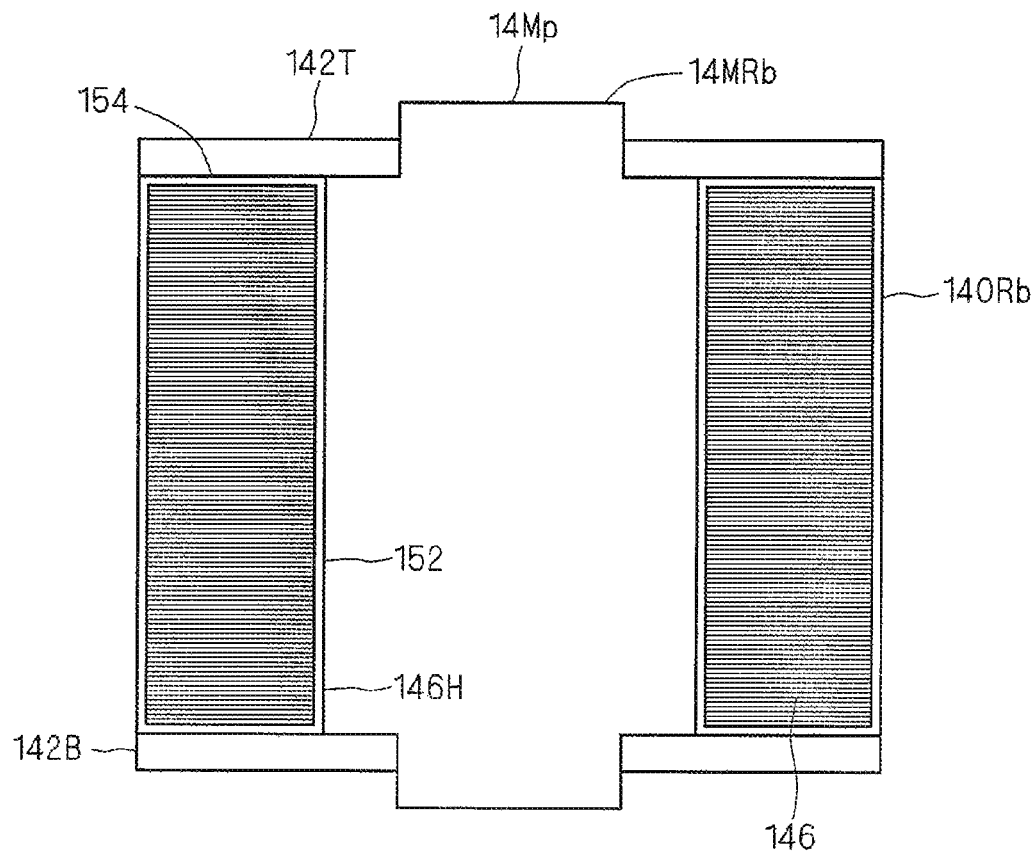
FIG. 27 is a cross-sectional view of the rotor of FIG. 22.

FIG. 27 is a cross-sectional view of the rotor 14Rb of FIG. 26. The rotor core 140Rb includes a pair of end plates 142T, 142B extending in a plane whose normal line is in the direction of the rotation axis Q, and a plurality of first electromagnetic steel plates 146 laminated in the direction of the rotation axis Q and interposed between the end plates 142T and 142B. A laminated body of the first electromagnetic steel plates 146 has a hole 146H extending therethrough in a lamination direction thereof, and the rare-earth magnet 14MRb is inserted through the hole 146H.

The length of the rare-earth magnet 14MRb with respect to the direction of the rotation axis Q is greater than the length of the aforesaid laminated body with respect to the direction of the rotation axis Q, and a protruding portion 14Mp of the rare-earth magnet 14MRb which protrudes from the laminated body presents a step. The area of the protruding portion 14Mp in the plane whose normal line is in the direction of the rotation axis Q is smaller than the area of the hole 146H in the plane whose normal line is in the direction of the rotation axis Q.

Each of the end plates 142T, 142B has a hole 144 matched with the protruding portion 14Mp, a step formed by the holes 144 and 146H is engaged with the step presented by the protruding portion 14Mp. The end plates 142T, 142B interpose therebetween the laminated body and the rare-earth magnet 14MRb from both sides with respect to the direction of the rotation axis Q, to form the rotor 14Rb.

Thus, the coil ends 16CE are opposed to the rare-earth magnet 14MRb with interposition of the end plates 142T, 142B. Here, when a material having a smaller heat capacity than that of the rare-earth magnet 14MRb is adopted as a material of the end plates 142T, 142B, large reduction of the heating efficiency can be avoided even if the end plates 142T, 142B are used.

Since the rare-earth magnet 14MRb is induction-heated with interposition of the end plates 142T, 142B, it is desirable that the rare-earth magnet 14MRb and the end plates 142T, 142B are thermally coupled with each other, but it is necessary to suppress heat dissipation from the rare-earth magnet 14MRb to the rotor core 140Rb. Accordingly, a first thermal insulator 152 whose heat capacity is larger than that of the rotor core 140Rb is arranged between the rotor core 140Rb and the rare-earth magnet 14MRb, that is, on a surface of the hole 146H, and a second thermal insulator 154 whose heat capacity is larger than that of the rotor core 140Rb is arranged between the rotor core 140Rb and the end plates 142T, 142B, that is, on end surfaces of the laminated body of the first electromagnetic steel plates 146.

More specifically, the arrangement of the first thermal insulator 152 and the second thermal insulator 154 can be realized by applying a thermal insulation film to the laminated body of the first electromagnetic steel plates 146 or coating the laminated body.

Therefore, the rare-earth magnet 14MRb can be efficiently induction-heated while maintaining the lamination of the first electromagnetic steel plates 146 by the end plates 142T, 142B.

<Modification>

Although in the above, preferred embodiments of the present invention have been described, the present invention is not limited to the above-described embodiments, and various embodiments described below are employable.

<Axial Gap Type Motor>

Figure 28:
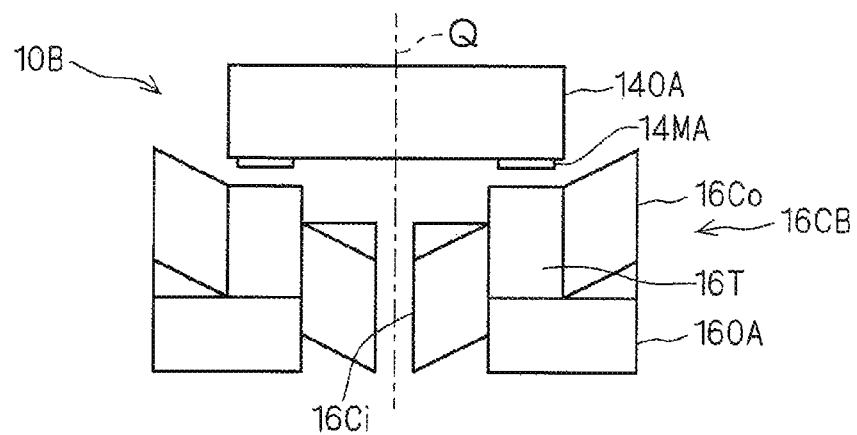
FIG. 28 is a side view of the axial gap type motor.
Figure 29:
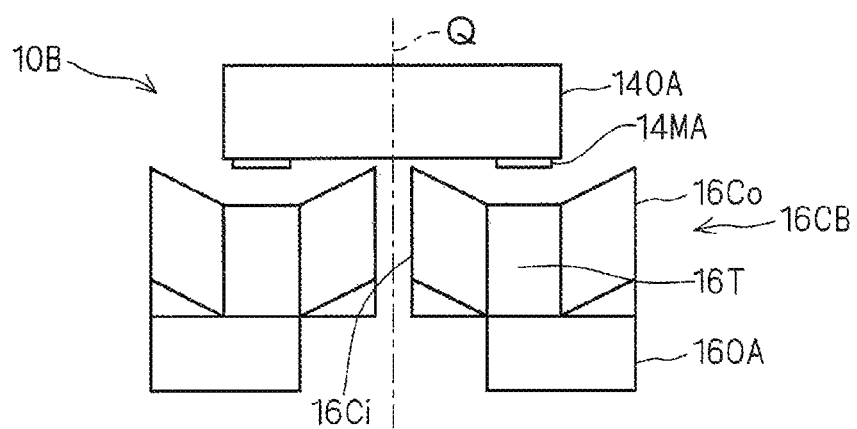
FIG. 29 is a side view of the axial gap type motor.
Figure 30:
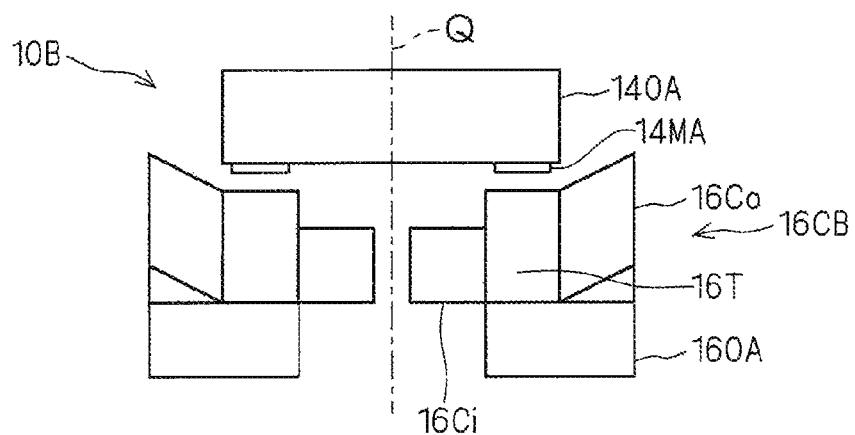
FIG. 30 is a side view of the axial gap type motor.

FIGS. 28 to 30 are side views of the axial gap type motor 10B. In this embodiment, one rotor and one stator are opposed to each other. In the rotor, a plurality of rare-earth magnets 14MA are arranged at the stator side of the rotor core 140A such that magnetic poles are alternately presented in a circumferential direction. The rotor core 140A operates as a back yoke of the rare-earth magnets 14MA. In the axial gap type motor 10B, an armature winding 16CB is wound in the distributed winding form, and as shown in FIG. 28, a portion 16Co of the armature winding 16CB at the outer circumference side is curved toward an outer edge end portion of the rare-earth magnet 14MA. In other words, a plurality of armature windings 16CB and a plurality of teeth 16TA are annularly arranged in the rotor core 140A, so that the portions 16Co of all the armature windings 16CB, as a whole, form a shape that covers the plurality of rare-earth magnets 14MA annularly arranged.

At this time, a portion 16Ci of the armature winding 16CB at the inner circumference side is curved toward the side opposite to the rotor 14A, and thereby imbalance among the respective phases of U, V, and W in the radial direction can be relieved.

Alternatively, as shown in FIG. 29, the portion 16Ci of the armature winding 16CB at the inner circumference side is curved toward an inner edge end portion of the rare-earth magnet 14MA. That is, it may be acceptable that the plurality of armature windings 16CB arranged in the rotor core 140A, as a whole, form a shape that covers the outer edge end portions and the inner edge end portions of the plurality of rare-earth magnets 14MA.

Alternatively, as shown in FIG. 30, a portion 16Ci of the armature winding 16CB at the inner circumference side may not be curved.

These embodiments can be appropriately selected in consideration of relieve of the imbalance among the phases, suppression of a resistance caused by the curving, heating efficiency, and the like.

These embodiments can be easily realized by forming the armature winding 16CB by a rectangular conductive wire having self-adhesiveness and making adhesion after the forming. If a non-magnetic holder of, for example, SUS is used when the rotor 14A holds the rare-earth magnet 14MA, the rare-earth magnet 14MA can be held against the centrifugal force without impairing the heating efficiency.

<IPM Motor>

Figure 31:
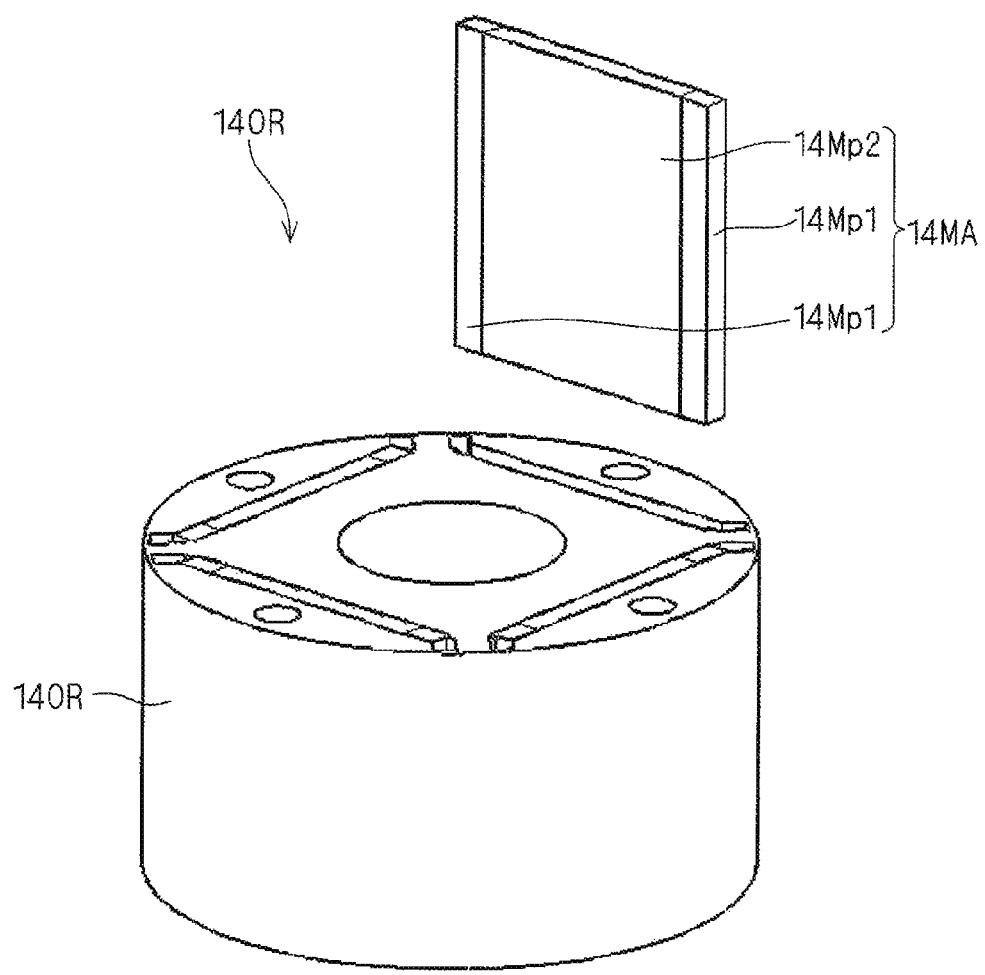
FIG. 31 is an exploded perspective view of the IPM rotor.

FIG. 31 is an exploded perspective view of an IPM rotor 14Ri. The IPM rotor 14Ri is a rotor mounted in the radial gap type motor 10R. The rare-earth magnet 14MR has, for example, two first magnet bodies 14Mp1 and a second magnet body 14Mp2, which are buried in the rotor core 140R while being aligned in a straight line with the second magnet body 14Mp2 being interposed between the two first magnet bodies 14Mp1. At this time, the second magnet body 14Mp2 is closer to the rotation axis Q than the first magnet bodies 14Mp1 are.

Here, a coercive force of the first magnet body 14Mp1 is set higher than a coercive force of the second magnet body 14Mp2, and thereby irreversible demagnetization of the rare-earth magnet 14MR can be avoided or suppressed.

FIG. 32 is a plan view of an IPM rotor 14Rj. In the IPM rotor 14Rj, the first magnet bodies 14Mp1 and the second magnet body 14Mp2 are buried so as to present a recessed shape opening at the outer circumference side of the rotor core 140R (that is, the stator side). Here, the recessed shape is formed by the two first magnet bodies 14Mp1 having a relatively higher coercive force approaching each other from both ends in a direction of extension of the second magnet body 14Mp2. At this time, since the location of the second magnet body 14Mp2 is relatively distant from the stator (not shown), irreversible demagnetization can be avoided or suppressed.

Furthermore, a thermal insulator 22 having a larger heat capacity than that of any of the magnet bodies may be provided between the first magnet body 14Mp1 and the second magnet body 14Mp2. As a specific example, resin spacers 22S may be inserted between the first magnet bodies 14Mp1 and the second magnet body 14Mp2, or resin coatings 22C may be applied to the first magnet bodies 14Mp1 and the second magnet body 14Mp2.

Alternatively, spaces may be provided between the first magnet bodies 14Mp1 and the second magnet body 14Mp2. In a case where the spaces are provided, the first magnet bodies 14Mp1 and the second magnet body 14Mp2 can be cooled by the cooling medium or a ventilation flow passing through the spaces.

This can block thermal transfer from the first magnet bodies 14Mp1 to the second magnet body 14Mp2, and thus irreversible demagnetization of the rare-earth magnet 14MR can be avoided or suppressed. Particularly, the coercive force of the first magnet bodies 14Mp1 is made high so that the magnetic flux weakening due to the induction heating is mainly performed therein, and a magnet having a high residual magnetic flux density can be adopted for the second magnet body 14Mp2.

FIG. 33 is a plan view of an IPM rotor 14Rk. The rare-earth magnet 14MR arranged in the IPM rotor 14Rk has two magnet bodies 14Mp.

A distance between a point in one of the two magnet bodies 14Mp which is closest to the stator (not shown) and a point in the other magnet body 14Mp which is closest to the stator is defined as a distance d1. When a distance between a point in the one magnet body 14Mp which is farthest from the stator and a point in the other magnet body 14Mp which is farthest from the stator is defined as a distance d2, the distance d1 is longer than the distance d2.

In short, in the rare-earth magnet 14MR, the two magnet bodies 14Mp are buried in the rotor core 140R so as to present a substantially V-like shape, and buried in such a manner that a portion corresponding to the opening side of the two side of the V-like shape is closest to the stator.

By arranging the rare-earth magnet 14MR, and particularly the magnet bodies 14Mp, in the above-described manner, the end points are located close to the stator, and therefore the end points can be selectively induction-heated.

In a case of the IPM motor, heating may be performed via the rotor core 140R. In such a case, a high thermal conductivity resin 24 may be arranged between the magnet bodies 14Mp and the rotor core 140R, or aluminum 26 may be arranged between the magnet bodies 14Mp and the rotor core 140R by die-casting.

<Heat Recovery from Magnet>

After a desired control is performed by thermal demagnetization, heat of the induction-heated rare-earth magnets 14MA, 14MR, 14MRb needs to be recovered. The temperature of the heated rare-earth magnets 14MA, 14MR, 14MRb is higher than the temperature of cooling medium at the time of the heating operation. That is, even during the heating operation, the temperature of cooling medium is lower than the temperature of the heated rare-earth magnets 14MA, 14MR, 14MRb. Accordingly, in the present invention, the cooling medium passage is provided near the rare-earth magnets 14MA, 14MR, 14MRb.

<Application of Field Control Coil—1>

Figure 34:
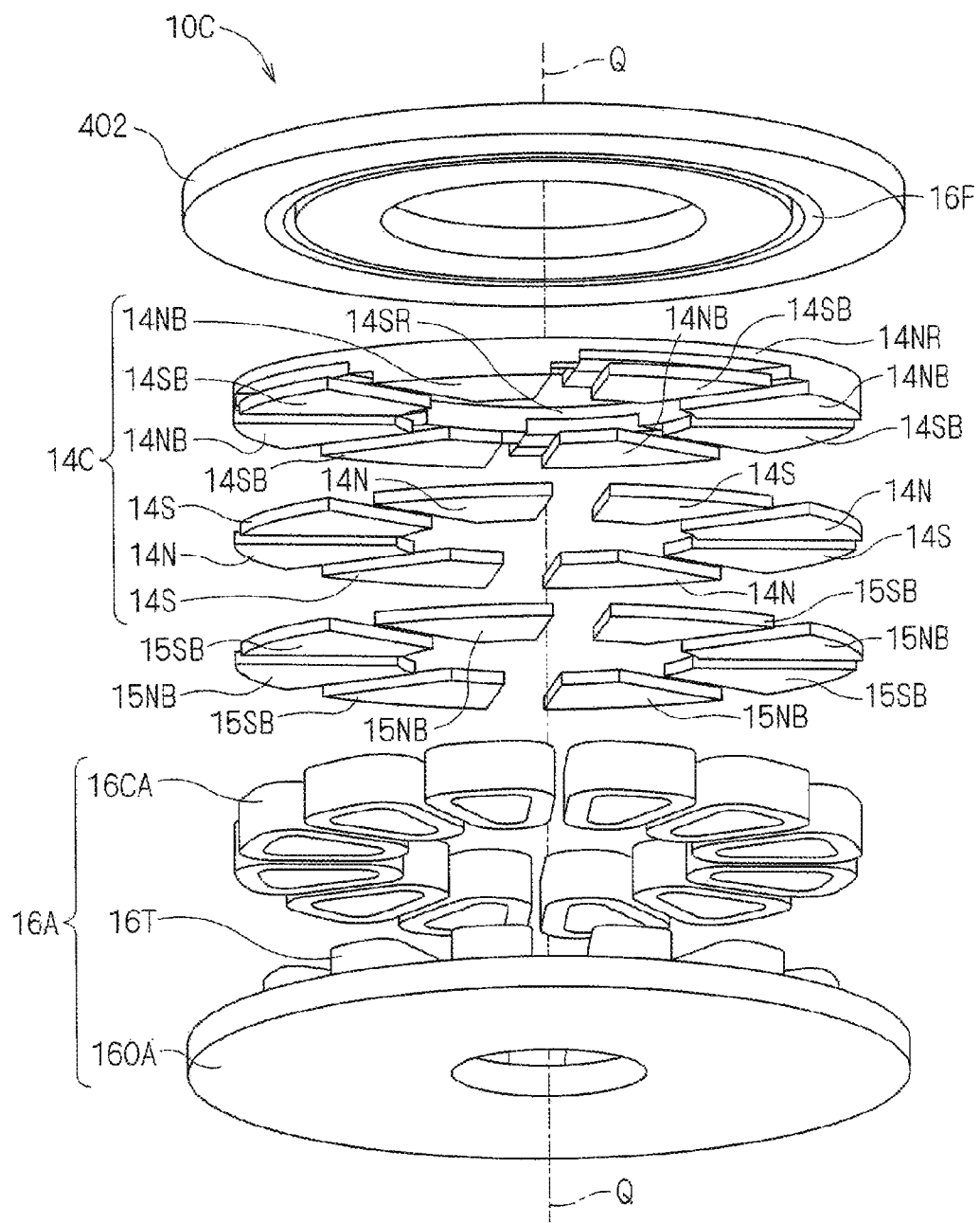
FIG. 34 is an exploded perspective view of the axial gap type motor.

FIG. 34 is an exploded perspective view of an axial gap type motor 10C, as separated along the direction of the rotation axis Q. In the axial gap type motor 10C, for example, a second stator 402 is provided, on a main surface thereof opposed to a rotor 14C, with a field control winding 16F. The second stator 402 is formed of a magnetic body, and an annular groove 404 whose central axis is the rotation axis Q and which opens at the rotor 14C side is provided in the second stator 402. In the groove 404, the field control winding 16F is wound around the rotation axis Q.

The field control winding 16F is a winding wound in the circumferential direction, and provided for generating a field magnetic flux which is linked to the armature winding 16CA to thereby perform a field weakening control. A magnetic flux of the rare-earth magnet 14MA can be weakened by a magnetic flux which is generated by a direct current being supplied to the field control winding 16F.

When the axial gap type motor 10C performs the heating high-load operation, the rare-earth magnet 14MA can be induction-heated by supplying a harmonic current HC to the field control winding 16F. When the axial gap type motor 10C performs the cooling high-load operation, the field weakening control can be performed by supplying a direct current to the field control winding 16F.

The rotor 14C of the axial gap type motor 10C has a following configuration. That is, the rotor 14C has a plurality of rare-earth magnets 14N, 14S, first magnetic plates 14NB, second magnetic plates 14SB, a first magnetic ring 14NR, and a second magnetic ring 14SR.

More specifically, a plurality of the rare-earth magnets 14N each having a N-pole magnetic pole surface at the armature winding 16CA side and a plurality of the rare-earth magnets 14S each having an S-pole magnetic pole surface at the armature winding 16CA side are alternately arranged in the circumferential direction around the rotation axis Q.

Each of the rare-earth magnets 14N is, at the side (S-pole side) opposite to the armature winding 16CA, laminated with each of the plurality of first magnetic plates 14NB in the direction of the rotation axis Q. Furthermore, the plurality of first magnetic plates 14NB are, at the side opposite to the armature winding 16CA, magnetically coupled with each other by the first magnetic ring 14NR. In the same manner, each of the rare-earth magnets 14S is, at the side (N-pole side) opposite to the armature winding 16CA, laminated with each of the plurality of second magnetic plates 14SB in the direction of the rotation axis Q. Furthermore, the plurality of second magnetic plates 14SB are, at the side opposite to the armature winding 16CA, magnetically coupled with each other by the second magnetic ring 14SR. Thus, the first magnetic ring 14NR and the second magnetic ring 14SR present concentric annuluses, and coupled to the first magnetic plates 14NB and the second magnetic plates 14SB, respectively.

Figure 35:
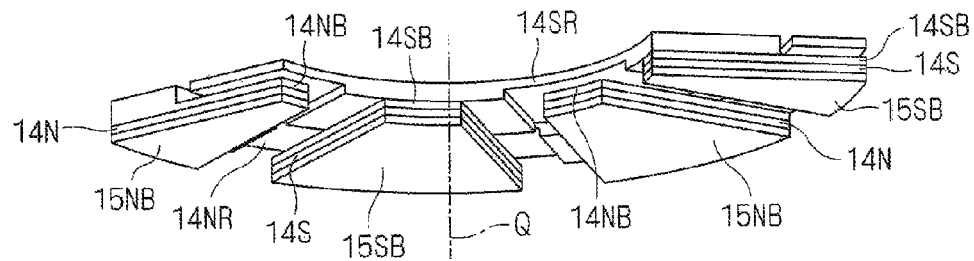
FIG. 35 is a cross-sectional perspective view showing a part of a rotor of FIG. 34.

FIG. 35 is a cross-sectional perspective view showing a part of the rotor 14C of FIG. 34, and showing a structure in which the first magnetic ring 14NR and the second magnetic ring 14SR, the first magnetic plates 14NB and the second magnetic plates 14SB, the rare-earth magnets 14N, 14S, and magnetic plates 15NB, 15SB are laminated along the direction of the rotation axis Q.

The first magnetic ring 14NR may be arranged either at the inner circumference side and at the outer circumference side of the second magnetic ring 14SR.

It may be also acceptable that the magnetic plate 15NB is laminated on the magnetic pole surface at the armature winding 16CA side of each of the plurality of rare-earth magnets 14N, while the magnetic plate 15SB is laminated on the magnetic pole surface at the armature winding 16CA side of each of the plurality of rare-earth magnets 14S. Providing the magnetic plates 15NB, 15SB can suppress demagnetization given to the rare-earth magnets 14N, 14S by a magnetic field generated due to the armature winding 16CA.

<Application of Field Control Coil—2>

Figure 36:
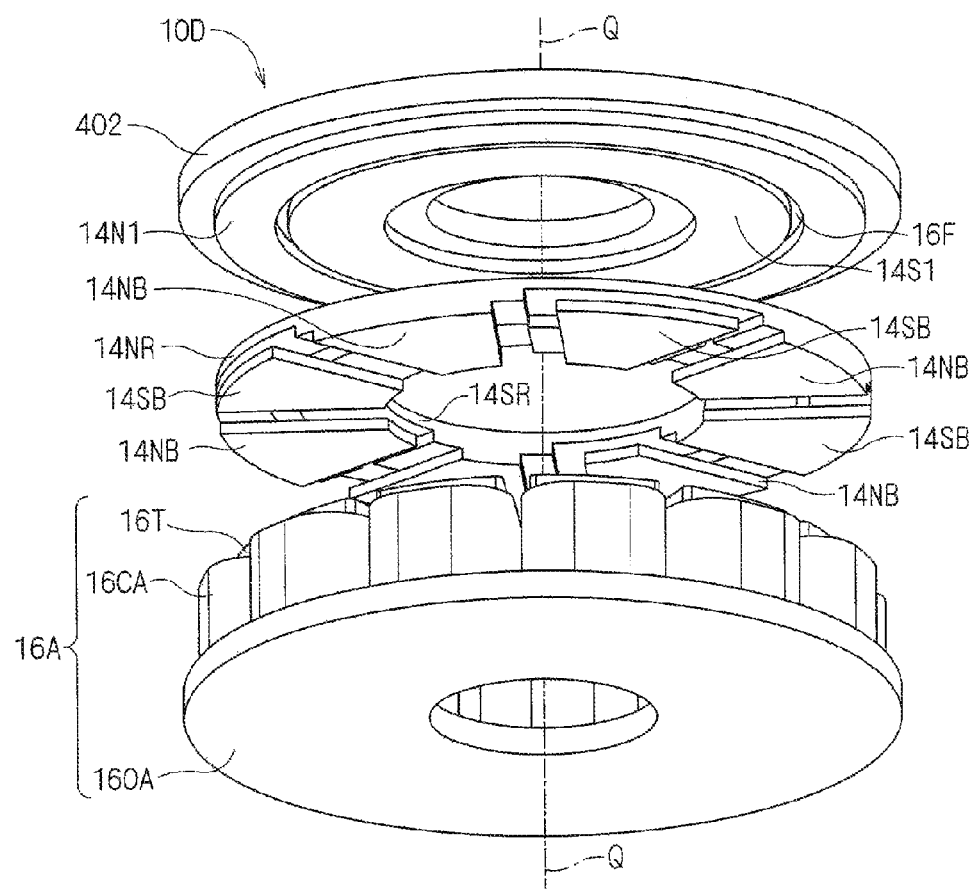
FIG. 36 is a diagram showing a modification of FIG. 34.

FIG. 36 is an exploded perspective view of an axial gap type motor 10D according to a first modification of FIG. 34, as separated along the direction of the rotation axis Q. In the axial gap type motor 10D, annular rare-earth magnets 14N1, 14S1 are provided in the second stator 402, instead of the rare-earth magnets 14N, 14S and the magnetic plates 15NB, 15SB shown in the axial gap type motor 10C described above. That is, the magnetic rings 14NR, 14SR and the magnetic plates 14NB, 14SB function as a rotor of the axial gap type motor 10D.

Specifically, the second stator 402 has the annular rare-earth magnets 14N1, 14S1 centered at the rotation axis Q, on a main surface opposed to the rotor among main surfaces thereof presented in planes whose normal lines are in the direction of the rotation axis Q. More specifically, the first magnetic ring 14NR constituting the rotor and the rare-earth magnet 14N1 are opposed to each other, and the second magnetic ring 14SR and the rare-earth magnet 14S1 are opposed to each other.

Although FIG. 36 illustrates a case where a field winding 16F is disposed between the rare-earth magnet 14N1 and the rare-earth magnet 14S1, the field winding 16F may be disposed at the outer circumference side of the rare-earth magnet 14N1 or at the inner circumference side of the rare-earth magnet 14S1.

<Application of Field Control Coil—3>

FIG. 37 is an exploded perspective view of an axial gap type motor 10E according to a second modification of FIG. 34, as separated along the direction of the rotation axis Q. FIG. 38 is a perspective view of the second stator 402 shown in FIG. 37, as seen from the armature winding 16CA side.

The annular rare-earth magnets 14N1, 14S1 may not necessarily be provided in the second stator 402, but may be provided in a rotor 14E, and more specifically in the magnetic rings 14NR, 14SR from the side opposite to the armature winding 16CA.

Specifically, the rare-earth magnet 14N1 may be provided on one of main surfaces of the first magnetic ring 14NR which is opposed to the second stator 402, while the rare-earth magnet 14S1 may be provided on one of the main surfaces of the second magnetic ring 14SR which is opposed to the second stator 402.

In any of the embodiments shown in FIG. 34 to FIG. 38, the first magnetic ring 14NR and the second magnetic ring 14SR, and consequently the first magnetic plates 14NB and the second magnetic plates 14SB, receive N-pole and S-pole field magnetic fluxes from the rare-earth magnets 14N, 14S (or the rare-earth magnets 14N1, 14S1).

In a case where the low-pressure cooling-medium jacket 38 (see FIG. 13) is adopted in the embodiment including application of the field control winding 16F as described above, the stator 16A having the armature winding 16CA is fixed to the compressor mechanism section 36 side. Thereby, heat is dissipated from the stator 16A to the container 32 via the compressor mechanism section 36. In this case, the low-pressure cooling-medium jacket 38 may be provided in the upper portion of the compressor mechanism section 36 within the container 32 which presents a high-pressure dome, and the cooling medium sucked at a low temperature may be brought into close contact with the stator 16A, to thereby cause heat exchange between the stator 16A and the cooling medium before reaching the vicinity of the rare-earth magnets 14N, 14S, 14N1, 14S1, thus actively cooling the stator. Cooling of the stator 16A suppresses a rise of the temperature of the armature winding 16CA, and a copper loss is suppressed.

<Coil Dedicated to Induction Heating>

Figure 39:
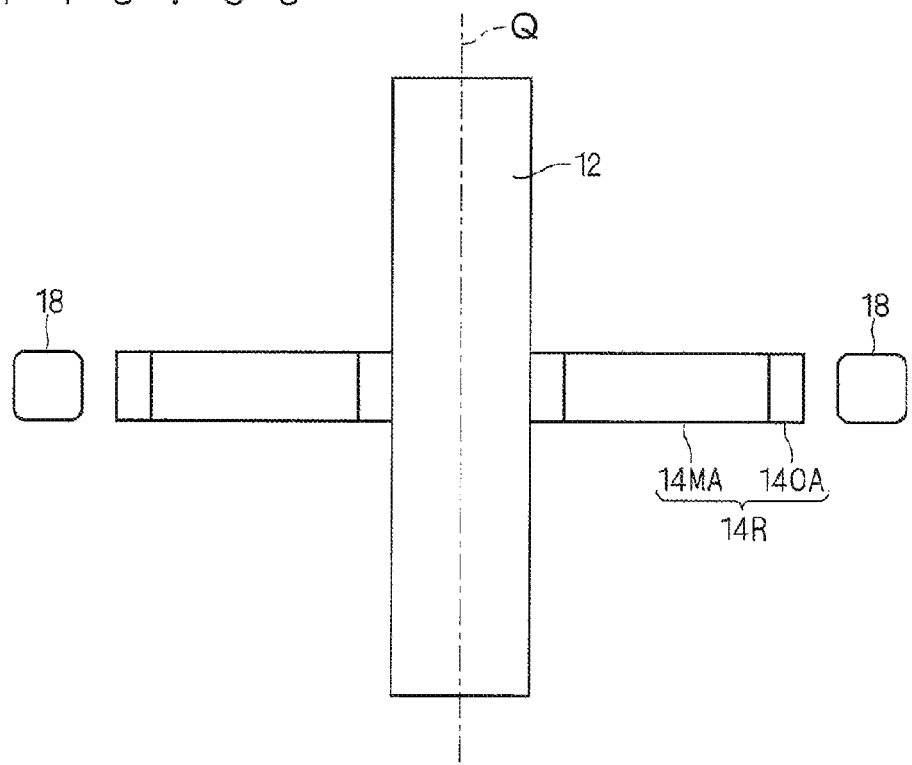
FIG. 39 is a cross-sectional view of the rotor of the axial gap type motor.

FIG. 39 is a cross-sectional view of the rotor 14A of the axial gap type motor 10A. In the present invention, it is not always necessary that the harmonic current HC is superimposed on the armature winding 16CA, 16CB, 16CR or the field winding 16F, but an auxiliary winding 18 dedicated to induction heating may be separately provided. For example, in a case where the auxiliary winding 18 is provided in the axial gap type motor 10A, an auxiliary winding 18 may be additionally provided around the rotor 14A in a plate in which the rotor 14A extends as shown in FIG. 39, and the harmonic current HC may be passed.

Figure 40:
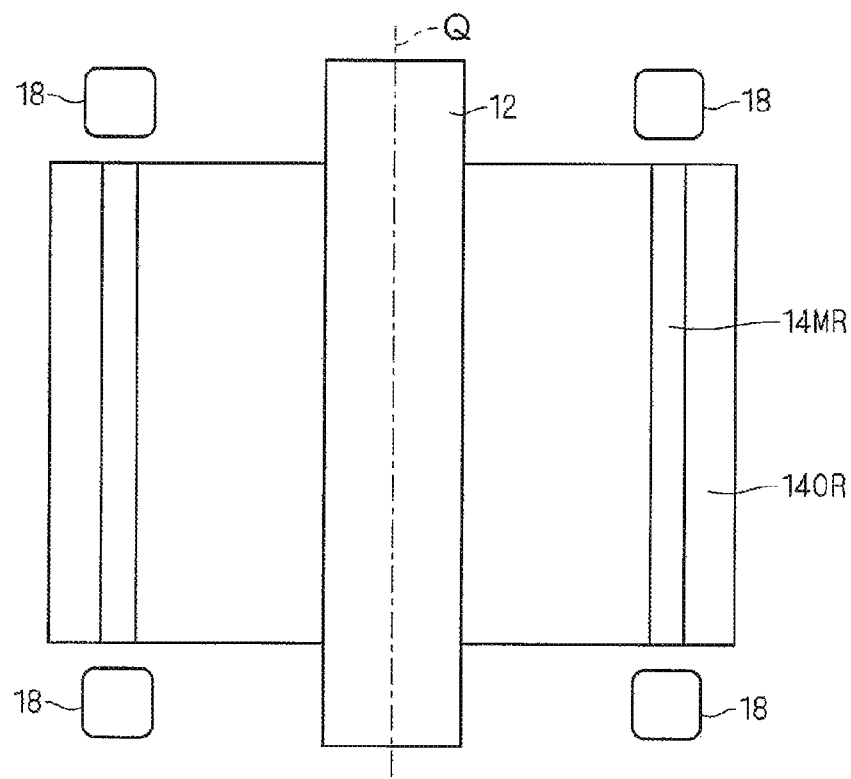
FIG. 40 is a cross-sectional view of the rotor of the radial gap type motor.

FIG. 40 is a cross-sectional view of the rotor 14R of the radial gap type motor 10R. In a case where the auxiliary winding 18 is provided in the radial gap type motor 10R, the auxiliary winding 18 is additionally provided at an end portion of the rotor 14R with respect to the direction of the rotation axis Q as shown in FIG. 40, and the harmonic current HC may be passed.

Figure 41:
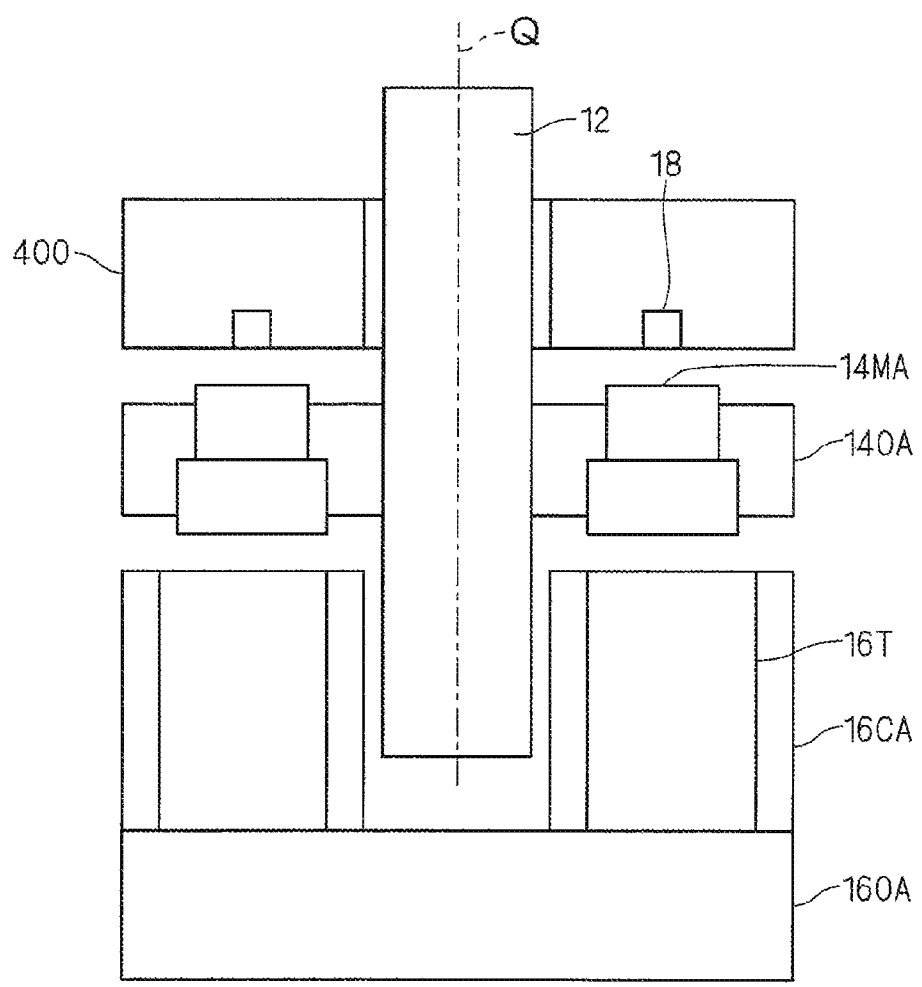
FIG. 41 is a cross-sectional view of an axial gap type motor having an unwound stator.

FIG. 41 is a cross-sectional view of the axial gap type motor 10D having the unwound stator 402. In a case of a motor including a stator 402 having no armature winding similarly to the second stator 400 described in FIG. 3, the auxiliary winding 18 may be additionally provided in the second stator 400, and the harmonic current HC may be passed.

Needless to say, the various embodiments described above may be adopted in appropriate combination.

While the invention has been described in detail, the foregoing description is in all respects illustrative and not restrictive. It is therefore understood that numerous modifications and variations can be devised without departing from the scope of the invention.

The invention claimed is:

1. An air conditioner capable of a heating operation and comprising a compressor, said compressor compressing a cooling medium and having a motor including a rotor and a stator mounted therein, said rotor having a plurality of rare-earth magnets rotatable in a circumferential direction around a shaft extending in a direction of a rotation axis, said stator having an armature winding opposed to said rotor, wherein in case of a heating high-load operation of said heating operation and said motor driving said compressor with the number of rotations equal to or greater than a predetermined number of rotations in said heating high-load operation, a harmonic current flows in said armature winding to induction-heat said rare-earth magnets, and the rare-earth magnets are demagnetized at a high temperature by an induction heating.

2. The air conditioner according to claim 1, wherein said air conditioner is further capable of a cooling operation,
in a case where said motor performs said heating high-load operation, said induction heating is performed,
in a case where, in said cooling operation, a cooling high-load operation is performed and said motor drives said compressor with the number of rotations equal to or greater than a predetermined number of rotations in said cooling high-load operation, a magnetic flux weakening control by means of a current-phase advance is performed.

3. The air conditioner according to claim 1, wherein said air conditioner is further capable of a cooling operation,
said air conditioner further comprises an inverter having a converter, a PWM inverter, and a DC link part said converter, converting an alternate current supplied from a power source into a direct current, said PWM inverter converting the direct current obtained from said converter into an alternate current and supplying the alternate current to said armature winding, said DC link part connecting said converter and said PWM inverter to each other,
in a case where said motor performs said heating high-load operation, said induction heating is performed,
in a case where, in said cooling operation, a cooling high-load operation is performed and said motor drives said compressor with the number of rotations equal to or greater than a predetermined number of rotations in said cooling high-load operation, a voltage of said DC link part is boosted by said converter.

4. The air conditioner according to claim 1, wherein said air conditioner is further capable of a cooling operation,
said air conditioner further comprises an inverter having a converter, a PWM inverter, and a DC link part, said converter converting an alternate current supplied from a power source into a direct current, said PWM inverter converting the direct current obtained from said converter into an alternate current and supplying the alternate current to said armature winding, said DC link part connecting said converter and said PWM inverter to each other,
a duty of an output signal outputted from said PWM inverter in said heating high-load operation is lower than a duty of an output signal outputted from said PWM inverter to said motor in a cooling high-load operation of said cooling operation and said motor drives said compressor with the number of rotations equal to or greater than a predetermined number of rotations in said cooling high-load operation,
a voltage of the DC link part of said inverter in said heating high-load operation is higher than a voltage of said DC link part in said cooling high-load operation.

5. The air conditioner according to claim 1, wherein said air conditioner further comprises an inverter having a converter, a PWM inverter, and a DC link part, said converter converting an alternate current supplied from a power source into a direct current, said PWM inverter converting the direct current obtained from said converter into an alternate current and supplying the alternate current to said armature winding, said DC link part connecting said converter and said PWM inverter to each other,
a carrier frequency of said inverter in said heating high-load operation is higher than a carrier frequency except in said heating high-load operation.

6. The air conditioner according to claim 1, wherein
said rotor has a rotor core,
said stator has a stator core,
an iron loss of a material of said stator core is smaller than that of said rotor core.

7. The air conditioner according to claim 6, wherein
said rotor has a plurality of first electromagnetic steel plates extending in a plane whose normal line is said rotation axis,
said stator has a plurality of second electromagnetic steel plates extending in said plane,
the thickness of one of said first electromagnetic steel plates with respect to the direction of said rotation axis is larger than the thickness of one of said second electromagnetic steel plates with respect to the direction of said rotation axis.

8. The air conditioner according to claim 6, wherein
either one of a silicon steel plate or an iron-dust core is adopted as a material of said rotor core,
any one of amorphous, ferritic core, and permalloy is adopted as a material of said stator core.

9. The air conditioner according to claim 1, wherein
said stator is fixed within a container of said compressor,
said container is provided with a heat dissipation fin at a position corresponding to a position where said stator is fixed.

10. The air conditioner according to claim 1, wherein
said motor is an axial gap type motor,
said compressor has a compressor mechanism section compressing said cooling medium, and a container housing therein said compressor mechanism section and said motor and presents a high-pressure dome,
said stator is provided at a said compressor mechanism section side in said container,
said compressor further includes a low-pressure cooling-medium jacket contact with surroundings of said compressor mechanism section within said high-pressure dome of said container or in contact with said stator having said armature winding.

11. The air conditioner according to claim 1, wherein
said motor is an axial gap type motor,
an air-cored coil is adopted as said armature winding.

12. The air conditioner according to claim 11, wherein
said rotors are opposed to each other with said stator being interposed therebetween in said direction of the rotation axis.

13. The air conditioner according to claim 12, wherein
said air-cored coil is formed of a rectangular wire having self-adhesiveness.

14. The air conditioner according to claim 12, wherein
said air-cored coil is shaped with a heat-resistant resin and a fiber filler.

15. The air conditioner according to claim 6, wherein
a harmonic absorption material functioned as which is an insulator is arranged between said armature winding and said stator core.

16. The air conditioner according to claim 6, wherein
said motor is a radial gap type motor,
said armature winding is wound in a distributed winding form or a wave winding form,
at least one of coil ends of said armature winding protrudes toward an end portion of said rotor core with respect to said direction of the rotation axis,
an end portion of said rare-earth magnet is opposed to said coil end without interposition of said rotor core.

17. The air conditioner according to claim 16, wherein
a self-adhesive material is adopted for said armature winding.

18. The air conditioner according to claim 17, wherein
a rectangular wire is adopted for said armature winding.

19. A method for manufacturing the air conditioner according to claim 17, comprising the steps of:
arranging said rotor core and then shaping an coil end of said armature winding; and
after shaping said coil end, making adhesion of said self-adhesive material.

20. The air conditioner according to claim 1, wherein
said motor is an axial gap type motor,
said armature winding is wound in a distributed winding form,
a portion of said armature winding at an outer circumference side thereof is curved toward an outer edge end portion of said rare-earth magnet.

21. The air conditioner according to claim 1, wherein
said motor is a radial gap type motor,
one of said rare-earth magnets has a plurality of magnet bodies, and is buried in a rotor core included in said rotor,
one of said plurality of magnet bodies has a coercive force higher than a coercive force of another of said magnet bodies arranged closer to said rotation axis than said one magnet body.

22. The air conditioner according to claim 1, wherein
said motor is a radial gap type motor,
one of said rare-earth magnets has a plurality of magnet bodies buried in a rotor core included in said rotor,
in said one of said rare-earth magnets, a distance between end points of said plurality of magnet bodies at a said stator side is longer than a distance between end points thereof at a side opposite to said stator.

23. The air conditioner according to claim 1, wherein
said rare-earth magnets are buried in a rotor core included in said rotor,
a thermally conductive body is arranged between said rare-earth magnet and a side surface of said rotor core.

24. The air conditioner according to claim 1, wherein
a flow line of said cooling medium flowing in said compressor is substantially in parallel with a cooling medium passage being in contact with said rare-earth magnets.

25. The air conditioner according to claim 24, wherein
said motor is a radial gap type motor,
said rotor further includes a rotor core in which said rare-earth magnets are buried and which extends in parallel with said rotation axis,
a space is provided in said rotor core so as to expose an end portion of each of said rare-earth magnets at a side of a side surface of said rotor core,
said cooling medium flows in said space.

26. The air conditioner according to claim 24, wherein
said motor is a radial gap type motor,
said rotor further includes a rotor core which arranges said rare-earth magnets in an exposed manner,
said cooling medium flows in an air gap of said radial gap type motor.

27. A compressor compressing a cooling medium and having a motor including a rotor and a stator mounted therein, said rotor having a plurality of rare-earth magnets rotatable in a circumferential direction around a shaft extending in a direction of a rotation axis, said stator having an armature winding opposed to said rotor, wherein
- said compressor further has a compressor mechanism section compressing said cooling medium, and a container housing therein said compressor mechanism section and said motor and presents a high-pressure dome,
- in case of a heating high-load operation and said motor driving said compressor with the number of rotations equal to or greater than a predetermined number of rotations in said heating high-load operation, a harmonic current flows in said armature winding to induction-heat said rare-earth magnets, and
- the rare-earth magnets are demagnetized at a high temperature by an induction heating.

* * * * *